(12) United States Patent
Godard et al.

(10) Patent No.: US 8,067,326 B2
(45) Date of Patent: *Nov. 29, 2011

(54) REFRACTORY MATERIALS

(75) Inventors: Hilary Tony Godard, Lindley, NY (US); Cameron Wayne Tanner, Horseheads, NY (US); Michelle M Wallen, Hammondsport, NY (US); Elizabeth Margaret Wheeler, Lindley, NY (US)

(73) Assignee: Corning Incorporated, Corning, NY (US)

( * ) Notice: Subject to any disclaimer, the term of this patent is extended or adjusted under 35 U.S.C. 154(b) by 232 days.

This patent is subject to a terminal disclaimer.

(21) Appl. No.: 11/922,580

(22) PCT Filed: Dec. 21, 2005

(86) PCT No.: PCT/US2005/046453
§ 371 (c)(1),
(2), (4) Date: Dec. 19, 2007

(87) PCT Pub. No.: WO2006/073841
PCT Pub. Date: Jul. 13, 2006

(65) Prior Publication Data
US 2009/0131241 A1 May 21, 2009

(51) Int. Cl.
*C04B 35/50* (2006.01)
*C04B 35/505* (2006.01)
*C04B 35/48* (2006.01)

(52) U.S. Cl. ........ 501/152; 501/103; 501/106; 501/107; 65/90; 65/374.11; 65/374.13

(58) Field of Classification Search .................. 501/152, 501/106, 107, 103; 65/90, 374.11, 374.13
See application file for complete search history.

(56) References Cited

U.S. PATENT DOCUMENTS

| | | | | |
|---|---|---|---|---|
| 4,033,790 | A | 7/1977 | Gunjigake et al. | 35/40 |
| 4,925,816 | A * | 5/1990 | Watanabe et al. | 501/104 |
| 5,094,677 | A | 3/1992 | Morena | 65/18.1 |
| 5,217,934 | A * | 6/1993 | Matsuhiro et al. | 501/106 |
| 5,254,510 | A * | 10/1993 | Matsuhiro et al. | 501/104 |
| 5,350,460 | A | 9/1994 | Pickrell et al. | 21/225 |
| 5,948,516 | A * | 9/1999 | Kriven et al. | 428/216 |
| 6,423,415 | B1 | 7/2002 | Greene et al. | 428/432 |
| 6,770,111 | B2 | 8/2004 | Morena et al. | 55/523 |

(Continued)

FOREIGN PATENT DOCUMENTS

| | | | |
|---|---|---|---|
| JP | 2003221272 | * | 8/2003 |
| WO | WO2006/073841 | | 7/2006 |
| WO | WO2007/145847 | | 12/2007 |

OTHER PUBLICATIONS

Machine translation JP document 2003-221272, Aug. 2003.*

(Continued)

*Primary Examiner* — Karl Group
(74) *Attorney, Agent, or Firm* — Siwen Chen

(57) ABSTRACT

Refractory materials are provided which contain $P_2O_5/R_2O_3$ constituents, where R is Y, Sc, Er, Lu, Yb, Tm, Ho, Dy, Tb, Gd, or a combination thereof, and/or $V_2O_5/R'_2O_3$ constituents where R' is Y, Sc, one or more rare earth elements, or a combination thereof. In certain embodiments, the refractory materials are xenotime-type materials and/or xenotime-stabilized zircon-type materials. The refractory materials can be used in the manufacture of glass and glass-ceramics. For example, the refractory materials, especially those that contain $P_2O_5/R_2O_3$ constituents, can be used as forming structures ("isopipes") in the fusion process for making flat sheets of glass such as the glass sheets used as substrates in the manufacture of flat panel displays.

36 Claims, 24 Drawing Sheets

U.S. PATENT DOCUMENTS

| | | | |
|---|---|---|---|
| 6,974,786 B2 | 12/2005 | Helfinstine et al. | 35/78 |
| 7,001,679 B2 | 2/2006 | Campbell et al. | |
| 7,300,896 B2 | 11/2007 | Zachau et al. | 501/9 |
| 2003/0121287 A1 | 7/2003 | Chalk et al. | 17/6 |
| 2009/0211299 A1* | 8/2009 | Tanner | 65/374.13 |

OTHER PUBLICATIONS

S. Erdei, et al., *Hydrolyzed colloid reaction (HCR) technique for preparation of $YVO_4$, $YPO_4$ and $YV_xP_{1-x}O_4$*.Elsevier Science B.V., Materials Letters 21 (1994) 143-14.

D. Bregiroux, et al. Sintering and microstructure of rare earth phosphate ceramics $REPO_4$ with RE=La Ce or Y, *Journal of the European Ceramic Society* 26 (2006) 279-287.

M. Ramzi, et al., *Optical and crystal-field analysis of $Er^{3+}$ ion in $Y_2O_3$-$P_2O_5$ thin films*, Journal of Luminescence 126 (2007) 165-170.

S. Lucas, et al. *Synthesis and Characterization of Rare Earth Phosphate Powders,* Key Engineering Materials vols. 206-213 (2002), pp. 47-50.

* cited by examiner

REFRACTORY MATERIALS

I. FIELD OF THE INVENTION

This invention relates to refractory materials and, in particular, to refractory materials which contain $P_2O_5/R_2O_3$ constituents, where R is Y, Sc, Er, Lu, Yb, Tm, Ho, Dy, Tb, Gd, or a combination thereof, and/or $V_2O_5/R'_2O_3$ constituents where R' is Y, Sc, one or more rare earth elements, or a combination thereof.

The refractory materials of the invention can be used in a variety of applications, a particularly preferred application being in the manufacture of glass and glass-ceramics. As just one example, the refractory materials, especially those that contain $P_2O_5/R_2O_3$ constituents, can be used as forming structures ("isopipes") in the fusion process for making flat sheets of glass such as the glass sheets used as substrates in the manufacture of flat panel displays.

II. DEFINITIONS

As used in the specification and claims, the following terms shall have the following meanings:

(1) "first constituent" shall mean $P_2O_5$;

(2) "second constituent" shall mean $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof (abbreviated "$R_2O_3$");

(3) "third constituent" shall mean $SiO_2$;

(4) "fourth constituent" shall mean $ZrO_2$, $HfO_2$, $ThO_2$, or a combination thereof (abbreviated "$AO_2$");

(5) a "xenotime-type material" shall mean $YPO_4$, $ScPO_4$, $ErPO_4$, $LuPO_4$, $YbPO_4$, $TmPO_4$, $HoPO_4$, $DyPO_4$, $TbPO_4$, $GdPO_4$, or a combination thereof (abbreviated "$RPO_4$");

(6) a "zircon-type material" shall mean $ZrSiO_4$, $HfSiO_4$, $ThSiO_4$, or a combination thereof (abbreviated "$ASiO_4$");

(7) a "xenotime-stabilized zircon-type material" shall mean a material which comprises the first, second, third, and fourth constituents and exhibits a higher decomposition temperature than the same material without the first and second constituents;

(8) an "RP refractory" shall mean a refractory material which comprises at least the first and second constituents and may comprise the third and fourth constituents;

(9) a "vanadate-type material" shall mean $YVO_4$, $ScVO_4$, $ErVO_4$, $LuVO_4$, $YbVO_4$, $TmVO_4$, $HoVO_4$, $DyVO_4$, $TbVO_4$, $GdVO_4$, $LaVO_4$, $CeVO_4$, $PrVO_4$, $NdVO_4$, $SmVO_4$, $EuVO_4$, or a combination thereof (abbreviated "$R'VO_4$");

(10) a "vanadate-stabilized zircon-type material" (also referred to as an "R'V refractory") shall mean a material which comprises:

(i) $V_2O_5$ (the "vanadate first constituent")

(ii) $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, $La_2O_3$, $Ce_2O_3$, $Pr_2O_3$, $Nd_2O_3$, $Sm_2O_3$, $Eu_2O_3$, or a combination thereof (the "vanadate second constituent");

(iii) the third constituent; and (iv) the fourth constituent, where the material has a higher decomposition temperature than the same material without the vanadate first and vanadate second constituents;

(11) a "stabilized zircon-type material" is a xenotime-stabilized zircon-type material, a vanadate-stabilized zircon-type material, or a combination thereof.

(12) the "decomposition temperature" of a zircon-type material or a stabilized zircon type material is the temperature above which a silicate liquid forms upon heating;

(13) a "flexural creep rate" at a specified temperature and a specified pressure is the creep rate measured using a three-point test;

(14) a "long-term use temperature" for a refractory shall mean use of the refractory at the specified temperature for longer than a week.

As known in the art, zircon ($ZrSiO_4$) normally includes some $HfSiO_4$, i.e., less than about 6.0 wt. %. Accordingly, as used herein, the third and fourth constituents of an RP or R'V refractory substantially satisfy the compositional formula $ZrSiO_4$ when they contain no more than 6.0 wt. % $HfSiO_4$ and the molar ratio, on an oxide basis, of the third constituent to the fourth constituent in the refractory is between 0.9 and 1.1.

The first and second constituents of an RP refractory substantially satisfy the compositional formula $YPO_4$ when the molar ratio, on an oxide basis, of $P_2O_5$ to $Y_2O_3$ in the refractory is between 0.9 and 1.1.

The word "isopipe" will be used in the specification and claims to refer generically to a body having a configuration suitable for use as a glass forming structure in a fusion downdraw process, irrespective of the particular shape of the body or whether formation of the body involves isopressing or not.

BACKGROUND OF THE INVENTION

A. Glass Substrates for Flat Panel Displays

Manufacturers of flat panel displays, such as, liquid crystal displays, use glass substrates to produce multiple displays simultaneously, e.g., six or more displays at one time. The width of a substrate limits the number of displays that can be produced on a single substrate, and thus wider substrates correspond to increased economies of scale. Also, display manufacturers need wider substrates to satisfy a growing demand for larger size displays.

In addition, such manufacturers are seeking glass substrates that can be used with polycrystalline silicon devices that are processed at higher temperatures (hereinafter referred to as "poly-silicon applications"). In particular, a need exists for high strain point glass compositions that do not undergo compaction during display manufacture. Such glasses generally require higher forming temperatures, thus leading to a need for improved refractories which can be used at critical points in such sheet manufacturing processes as the fusion process.

B. Fusion Process

The fusion process is one of the basic techniques used in the glass making art to produce sheet glass. See, for example, Varshneya, Arun K., "Flat Glass," *Fundamentals of Inorganic Glasses*, Academic Press, Inc., Boston, 1994, Chapter 20, Section 4.2., 534-540. Compared to other processes known in the art, e.g., the float and slot draw processes, the fusion process produces glass sheets whose surfaces have superior flatness and smoothness. As a result, the fusion process has become of particular importance in the production of the glass substrates used in the manufacture of flat panel display devices, e.g., liquid crystal displays (LCDs).

The fusion process, specifically, the overflow downdraw fusion process, is the subject of commonly-assigned U.S. Pat. Nos. 3,338,696 and 3,682,609, to Stuart M. Dockerty, the contents of which are incorporated herein by reference. A schematic drawing of the process of these patents is shown in FIG. 1. As illustrated therein, the system includes a supply pipe 9 which provides molten glass to a collection trough 11 formed in a refractory body 13 known as an "isopipe."

Once steady state operation has been achieved, molten glass passes from the supply pipe to the trough and then overflows the weirs (i.e., the tops of the trough on both sides), thus forming two sheets of glass that flow downward and inward along the outer surfaces of the isopipe. The two sheets meet at the bottom or root 15 of the isopipe, where they fuse together into a single sheet. The single sheet is then fed to drawing equipment (represented schematically by arrows 17), which controls the thickness of the sheet by the rate at which the sheet is drawn away from the root.

A vertical temperature gradient imposed on the isopipe is used to manage the viscosity of the glass. At the root of the isopipe, the glass viscosity is typically in the range of approximately 100 to 300 kP.

As can be seen in FIG. 1, the outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

As is evident from the foregoing, isopipe 13 is critical to the success of the fusion process as it makes direct contact with the glass during the forming process. Thus, the isopipe needs to fulfill strict chemical and mechanical requirements to have a lifetime that is not too short and to deliver a quality sheet glass product. For example, the isopipe should not be rapidly attacked by or be the source of defects in the glass. Also, it should be able to withstand a vertical temperature gradient of, for example, 100° C. during use, and transient gradients larger than that during heat up. In addition, the rate of deflection due to creep at the use temperature should be low.

In particular, the dimensional stability of the isopipe is of great importance since changes in isopipe geometry affect the overall success of the fusion process. See, for example, Overman, U.S. Pat. No. 3,437,470, and Japanese Patent Publication No. 11-246230.

Significantly, the conditions under which the isopipe is used make it susceptible to dimensional changes. Thus, the isopipe operates at elevated temperatures on the order of 1000° C. and above. Moreover, the isopipe operates at these elevated temperatures while supporting its own weight as well as the weight of the molten glass overflowing its sides and in trough 11, and at least some tensional force that is transferred back to the isopipe through the fused glass as it is being drawn. Depending on the width of the glass sheets that are to be produced, the isopipe can have an unsupported length of two meters or more.

C. Isopipes Composed of Commercially Available Zircon

To withstand the above demanding conditions, isopipes 13 have been manufactured from isostatically pressed blocks of refractory material (hence the name "iso-pipe"). In particular, isostatically-pressed zircon refractories, such as those sold by St. Gobain-SEFPRO of Louisville, Ky. (hereinafter referred to as "SG zircon reference material" or simply "SG material"), have been used to form isopipes for the fusion process.

Use of a zircon isopipe limits the fusion process in two ways. First, zircon dissolves into the glass at hotter regions near the weirs of the isopipe, and then precipitates in the cooler regions near the root to form secondary zircon crystals. See U.S. Patent Publication No. 2003/0121287, published Jul. 3, 2003, the contents of which are incorporated herein by reference. These crystals can be sheared off by the glass flow, and become inclusions in the sheet. Secondary crystals incorporated into the drawn glass are visual defects. Panels with such defects are rejected. Secondary zircon precipitation has been controlled by restricting the weir-root temperature difference to less than about 100° C., thereby limiting the types of glasses that can be fusion formed to the high standards of glass quality required by display manufacturers because only glasses which have the requisite viscosity properties over this temperature range can be used.

Second, zircon also restricts the lifetime and operating temperature range of an isopipe because of its high temperature creep characteristics. As discussed in detail below, zircon decomposes at high temperature to silica liquid and zirconia. Silica liquid at grain boundaries increases the creep rate. This makes firing the refractory a compromise between microstructural quality and creep behavior. Display glass drawn on an isopipe with excessive creep deformation cannot meet the uniform thickness requirements because the weirs deform, changing the mass distribution across the isopipe beyond the compensational capability of conventional operational tools.

Thus, even though zircon is considered to be a high performance refractory material, in practice, isopipes composed of commercially available zircon exhibit dimensional changes which limit their useful life.

D. Intrinsic Rate of Creep

In view of the foregoing, it is desirable to reduce the intrinsic rate of creep for any material used as an isopipe to: 1) enable use of a wider pipe, 2) extend the fusion draw process to higher temperature glasses (e.g., higher strain point glass that is more compatible with poly-silicon display manufacturing processes), and/or 3) extend the service life of the isopipe and thus minimize process down time and replacement costs.

Analysis shows that the rate of isopipe sag is proportionate to its length raised to the fourth power and inversely proportionate to the square of its height. A doubling in the length of the isopipe (with the same life requirement and temperature capability) requires either a 16 fold decrease in intrinsic creep rate or a four fold increase in height. The current process for fabrication of zircon isopipes (cold isostatic pressing followed by sintering) cannot accommodate a four fold increase in isopipe height. The maximum length for a zircon isopipe which still has a reasonable service life has thus in essence been reached in the art or shortly will be reached with the current isopipe manufacturing technology. Accordingly, the ability to satisfy future requirements of flat panel display manufacturers for larger substrates will be substantially compromised with current technology.

As illustrated below, the present invention provides refractory materials that in their preferred embodiments have significantly improved creep rates compared to commercially available zircon, e.g., well below the 16-fold decrease in creep rate needed to compensate for a doubling in the length of an isopipe. As also illustrated below, the preferred materials are compatible with the types of glass compositions used to make substrates for flat panel displays. Accordingly, these refractories are especially well-suited for use as all or part of an isopipe for producing flat glass by a fusion process because they can address some or all of the length, processing temperature, and/or sag problems of existing refractory materials, specifically, commercially available zircon. Although use in connection with isopipes is a preferred application for the refractories of the invention, it is to be understood that the invention is not limited in any way to this application but can be employed in a wide variety of applications where high performance materials are desirable.

SUMMARY OF THE INVENTION

In accordance with a first aspect, the invention provides xenotime-type materials for use in glass making equipment. More particularly, in accordance with this aspect, the invention provides apparatus for producing a glass or a glass-ceramic (e.g., melting, conditioning, and/or forming apparatus) said apparatus comprising a surface adapted to contact the glass or the glass-ceramic when the glass or the glass-ceramic is in a molten state (e.g., a surface that directs a flow of the molten glass or the molten glass-ceramic), at least a portion of the apparatus (e.g., 50-100 volume percent) being composed of a refractory material that comprises on an oxide basis:

(i) 1-50 mole percent $P_2O_5$ (the first constituent); and
(ii) 1-50 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof (the second constituent).

In accordance with this aspect, at least a portion of the first and second constituents together can have a crystal structure which has the I41/amd space group.

As one example, the apparatus can be a forming trough of a fusion process, in which case, the forming trough preferably has an operating temperature above 1280° C., has a length sufficient to produce sheets of the glass or the glass-ceramic having a width of at least 2.5 meters, and/or a use life of at least 3.5 years when operated at a temperature that is less than or equal to 1280° C.

Preferably, the refractory material has a flexural creep rate at 1250° C. and 1000 psi that is less than $45 \times 10^{-6}$/hour.

In certain embodiments, the refractory material comprises, on an oxide basis, 25-50 mole percent of the first constituent and 25-50 mole percent of the second constituent, in which case, the refractory material preferably has a flexural creep rate at 1250° C. and 1000 psi that is less than or equal to $15 \times 10^{-6}$/hour, more preferably less than or equal to $10 \times 10^{-6}$/hour, and most preferably less than or equal to $1 \times 10^{-6}$/hour.

In other embodiments, the refractory material can comprise:

(i) 1-49 mole percent $SiO_2$ (the third constituent); and
(ii) 1-49 mole percent $ZrO_2$, $HfO_2$, $ThO_2$, or a combination thereof (the fourth constituent).

In connection with these embodiments, the refractory material can comprise, on an oxide basis, at least 25 mole percent of the third constituent and at least 25 mole percent of the fourth constituent, in which case, the refractory material preferably has a flexural creep rate at 1180° C. and 1000 psi that is less than or equal to $1.5 \times 10^{-6}$/hour, more preferably less than or equal to $1.0 \times 10^{-6}$/hour, and most preferably less than or equal to $0.5 \times 10^{-6}$/hour. Also in connection with these embodiments, the refractory material can comprise, on an oxide basis, at least 5 mole percent of the first constituent and at least 5 mole percent of the second constituent, e.g., the refractory material can comprise, on an oxide basis, approximately 13 mole percent of the first constituent and approximately 13 mole percent of the second constituent.

In further embodiments, the refractory material can comprise, on an oxide basis, at least 25 mole percent of the first constituent and at least 25 mole percent of the second constituent, in which case, the refractory material preferably has a flexural creep rate at 1250° C. and 1000 psi that is less than or equal to $15 \times 10^{-6}$/hour, more preferably less than or equal to $10 \times 10^{-6}$/hour, and most preferably less than or equal to $1 \times 10^{-6}$/hour. Also in connection with these embodiments, the refractory material can comprise, on an oxide basis, at most 20 mole percent of the third constituent and at most 20 mole percent of the fourth constituent.

In accordance with a second aspect, the invention provides a method for producing a glass or a glass-ceramic comprising: (1) providing apparatus in accordance with the first aspect of the invention and (2) contacting at least a portion of the surface of the apparatus with the glass or the glass-ceramic to be produced while that glass or glass-ceramic is in a molten state. In certain embodiments of this aspect of the invention, the temperature of the molten glass or glass-ceramic can be, for example, above 1280° C.

In accordance with a third aspect, the invention provides man-made/synthesized refractory bodies that are composed of a xenotime-type material. More particularly, in accordance with this aspect, the invention provides a refractory body (e.g., a brick, block, channel, or tube) having a volume of at least 200 cubic centimeters, said body comprising at least 90 volume percent of a phase which, on an oxide basis, comprises:

(i) at least 30 mole percent $P_2O_5$; and
(ii) at least 30 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

The refractory body can, for example, have a long-term use temperature greater than or equal to 1650° C.

In accordance with a fourth aspect, the invention provides man-made/synthesized refractory bodies that are composed of a xenotime-stabilized zircon-type material. More particularly, in accordance with this aspect, the invention provides a refractory body (e.g., a brick, block, channel, or tube) having a volume of at least 200 cubic centimeters, said body comprising at least 90 volume percent of a phase which, on an oxide basis, consists of:

(i) 2.5-13.0 mole percent $P_2O_5$;
(ii) 2.5-13.0 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof; and
(iii) the remainder of the phase being $ZrSiO_4$, $HfSiO_4$, $ThSiO_4$, or a combination thereof;

wherein (i) and (ii) are in a dissolved state in (iii).

The refractory body can, for example have a decomposition temperature greater than or equal to 1650° C.

In accordance with a fifth aspect, the invention provides man-made/synthesized refractory bodies that are composed of a xenotime-stabilized zircon-type material plus a xenotime-type material. More particularly, in accordance with this aspect, the invention provides a refractory body (e.g., a brick, block, channel, or tube) having a volume of at least 200 cubic centimeters, said body comprising:

(A) a first phase which, on an oxide basis, consists of:
(i) 2.5-13.0 mole percent $P_2O_5$;
(ii) 2.5-13.0 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof; and
(iii) the remainder of the phase being $ZrSiO_4$, $HfSiO_4$, $ThSiO_4$, or a combination thereof;
wherein (i) and (ii) are in a dissolved state in (iii); and
(B) a second phase which, on an oxide basis, comprises:
(i) at least 30 mole percent $P_2O_5$; and
(ii) at least 30 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof;

wherein the first and second phases together comprise at least 90 volume percent of the body.

The refractory body can, for example, have a decomposition temperature greater than or equal to 1650° C.

In accordance with a sixth aspect, the invention provides apparatus for use in making a glass or a glass-ceramic comprising a body having a configuration suitable for use as a glass forming structure in a fusion downdraw process, said body comprising a phase which, on an oxide basis, comprises:

(i) at least 30 mole percent $P_2O_5$; and
(ii) at least 30 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

The phase can, for example, comprise at least 90 volume percent of the body.

In certain embodiments, the body can comprise a second phase which, on an oxide basis, consists of:
(a) 2.5-13.0 mole percent $P_2O_5$;
(b) 2.5-13.0 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof; and
(c) the remainder of the phase being $ZrSiO_4$, $HfSiO_4$, $ThSiO_4$, or a combination thereof;
wherein (a) and (b) are in a dissolved state in (c).

In accordance with a seventh aspect, the invention provides apparatus for use in making a glass or a glass-ceramic comprising a body having a configuration suitable for use as a glass forming structure in a fusion downdraw process, said body comprising a phase which, on an oxide basis, consists of:
(i) 2.5-13.0 mole percent $P_2O_5$;
(ii) 2.5-13.0 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof; and
(iii) the remainder of the phase being $ZrSiO_4$, $HfSiO_4$, $ThSiO_4$, or a combination thereof;
wherein (i) and (ii) are in a dissolved state in (iii).

The phase can, for example comprise at least 90 volume percent of the body.

In certain embodiments, the body can comprise a second phase which, on an oxide basis, comprises:
(i) at least 30 mole percent $P_2O_5$; and
(ii) at least 30 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

In accordance with an eighth aspect, the invention provides apparatus for use in making a glass or a glass-ceramic comprising a body having a configuration suitable for use as a glass forming structure in a fusion downdraw process, said body comprising:
(A) a first phase which, on an oxide basis, consists of:
(i) 2.5-13.0 mole percent $P_2O_5$;
(ii) 2.5-13.0 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof; and
(iii) the remainder of the phase being $ZrSiO_4$, $HfSiO_4$, $ThSiO_4$, or a combination thereof;
wherein (i) and (ii) are in a dissolved state in (iii); and
(B) a second phase which, on an oxide basis, comprises:
(i) at least 30 mole percent $P_2O_5$; and
(ii) at least 30 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

The first and second phases together can, for example, comprise at least 90 volume percent of the body.

In accordance with each of the sixth, seventh, and eighth aspects of the invention, in certain embodiments, the body can, for example, be operated at a temperature above 1280° C. Also, in connection with each of these aspects of the invention, the body preferably has a length sufficient to produce sheets of a glass or a glass-ceramic having a width of at least 2.5 meters and/or a use life of at least 3.5 years when operated at a temperature that is less than or equal to 1280° C.

In accordance with a ninth aspect, the invention provides a method for making a refractory part having a volume of at least 200 cubic centimeters comprising:
(a) forming a green body for the part (e.g.; by a process that comprises uniaxial pressing, isostatic pressing, extrusion, slip cast molding, gel casting, or a combination thereof); and
(b) firing the green body at a temperature above 1590° C. (e.g., by a process that comprises atmospheric pressure firing, hot uniaxial pressing, hot isostatic pressing, or a combination thereof);
wherein the fired green body comprises:
(A) a phase which, on an oxide basis, consists of:
(i) 2.5-13.0 mole percent $P_2O_5$;
(ii) 2.5-13.0 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof; and
(iii) the remainder of the phase being $ZrSiO_4$, $HfSiO_4$, $ThSiO_4$, or a combination thereof;
wherein (i) and (ii) are in a dissolved state in (iii); and/or
(B) a phase which, on an oxide basis, comprises:
(i) at least 30 mole percent $P_2O_5$; and
(ii) at least 30 mole percent $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

In certain embodiments of this aspect of the invention, the maximum pressure used in forming the green body is preferably 10,000 psi and the fired green body has a density of at least 85 percent of its maximum theoretical density.

In other embodiments, the part can be machined from the fired green body.

In further embodiments, the firing of step (B) is conducted on platinum or zirconia.

In additional embodiments, when the fired body contains primarily phase (B), step (b) is preferably conducted above 1650° C.

In accordance with a tenth aspect, the invention provides an un-fired body which has been formed into a pre-selected shape (e.g., by uniaxial pressing, isostatic pressing, extrusion, slip cast molding, gel casting, or a combination thereof), said shape having a volume of at least 200 cubic centimeters, said body comprising an inorganic component which comprises on an oxide basis:
(i) at least 1.0 wt. % $SiO_2$;
(ii) at least 2.0 wt. % $ZrO_2$, $HfO_2$, $ThO_2$, or a combination thereof;
(iii) at least 1.0 wt. % $P_2O_5$; and
(iv) at least 2.0 wt. % $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

In accordance with an eleventh aspect, the invention provides an un-fired body which has been formed into a pre-selected shape (e.g., by uniaxial pressing, isostatic pressing, extrusion, slip cast molding, gel casting, or a combination thereof), said shape having a volume of at least 200 cubic centimeters, said body comprising an inorganic component which comprises on an oxide basis:
(i) at least 5.0 wt. % $P_2O_5$; and
(ii) at least 10.0 wt. % $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

In certain embodiments of the tenth and eleventh aspects of the invention, the un-fired body can further comprise a binder.

In other embodiments of these aspects, the maximum pressure used in forming the un-fired body into the pre-selected shape can be 10,000 psi and after firing, the body can have a density of at least 85 percent of its maximum theoretical density.

In accordance with a twelfth aspect, the invention provides a method for increasing the decomposition temperature of a refractory material that comprises $ZrSiO_4$, $HfSiO_4$, $ThSiO_4$, or a combination thereof comprising including in the material sufficient amounts of first and second constituents to raise the material's decomposition temperature (e.g., to, for example, above 1590° C.), wherein the first constituent comprises $P_2O_5$, and the second constituent comprises $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof.

In certain embodiments of this aspect of the invention, the concentrations of the first and second constituents in the material are each at least 5 mole percent on an oxide basis, e.g., the concentrations of the first and second constituents in the material can each be approximately 13 mole percent on an oxide basis.

In accordance with a thirteenth aspect, the invention provides a method for sintering a body that comprises $ZrSiO_4$, $HfSiO_4$, $ThSiO_4$, or a combination thereof comprising:

(a) including first and second constituents in the body, wherein the first constituent comprises $P_2O_3$ and the second constituent comprises $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination thereof; and (b) sintering the body by exposing it to a temperature above 1590° C. for at least 10 minutes.

In certain embodiments of this aspect of the invention, the concentrations of the first and second constituents in the material are each at least 5 mole percent on an oxide basis, e.g., the concentrations of the first and second constituents in the material can each be approximately 13 mole percent on an oxide basis.

In accordance with a fourteenth aspect, the invention provides a refractory body (e.g., a brick, block, channel, or tube) having a volume of at least 200 cubic centimeters, said body comprising at least 90 volume percent of a phase which, on an oxide basis, consists of:

(i) 1.0-20.0 mole percent $V_2O_5$;
(ii) 1.0-20.0 mole percent $Y_2O_3$, $Sc_2O_3$, $RE_2O_3$, where RE is a rare earth element, or a combination thereof; and
(iii) the remainder of the phase being $ZrSiO_4$, $HfSiO_4$, $ThSiO_4$, or a combination thereof;

wherein (i) and (ii) are in a dissolved state in (iii).

In certain embodiments of this aspect of the invention, the body can have a decomposition temperature greater than or equal to 1650° C.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention and are intended to provide an overview or framework for understanding the nature and character of the invention. Also, the above listed aspects of the invention, as well as the preferred and other embodiments of the invention discussed below, can be used separately or in any and all combinations.

The accompanying figures are included to provide a further understanding of the invention, and are incorporated in and constitute a part of this specification. The figures illustrate various embodiments of the invention, and together with the description serve to explain the principles and operation of the invention.

BRIEF DESCRIPTION OF THE FIGURES

(FIG. 4A) and 1000° C. (FIG. 4B).

FIGS. 5A, 5B, 5C, and 5D correspond to batches #1-#4, respectively, of Table 1. Second phase yttria is visible in FIG. 5C.

FIG. 9A shows a glass-xenotime interface (xenotime Sample D) and FIG. 9B shows a glass-zircon interface (SG material). Note that the zircon interface has primary grains detached from the zircon surface. No such grain detachment was seen for the xenotime interface.

(FIG. 21A) and 1760° C. (FIG. 21B) for 4 hours in each case.

DETAILED DISCUSSION OF THE INVENTION AND ITS PREFERRED EMBODIMENTS

Figure 1:
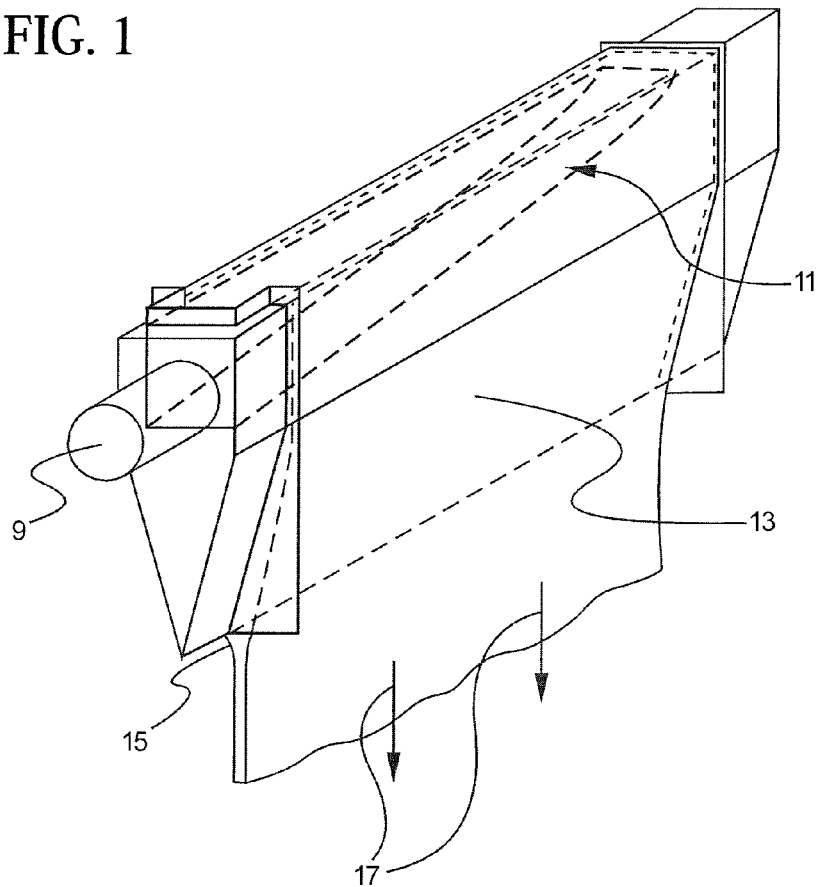
FIG. 1 is a schematic drawing illustrating a representative construction for an isopipe for use in an overflow downdraw fusion process for making flat glass sheets. This drawing is not intended to indicate scale or relative proportions of the elements shown therein.

As discussed above, in accordance with certain of its aspects, the present invention relates to RP refractory materials which comprise a first constituent ($P_2O_5$) and a second constituent ($R_2O_3$). In certain preferred embodiments, the first and second constituents are the largest constituents of the refractory. In other preferred embodiments, the first and second constituents are used along with a third constituent ($SiO_2$) and a fourth constituent ($AO_2$) to produce a xenotime-stabilized zircon-type material. In accordance with other aspects, refractories are provided which comprise a vanadate-stabilized zircon-type material.

The first and second constituents (i.e., $P_2O_5$ and $R_2O_3$) of an RP refractory can each constitute, on an oxide basis, from 1 to 50 mol % of the refractory. Amounts greater than or equal to 25 mol % for each of the first and second constituents generally correspond to refractories which can be characterized primarily as a xenotime-type material. Smaller amounts (e.g., amounts less than or equal to 13 mol % for each of the first and second constituents) generally correspond to refractories where a xenotime-type material is used to stabilize a zircon-type material.

RP refractories which can be characterized primarily as xenotime-type materials generally have enhanced refractory properties compared to RP refractories where the xenotime-type material serves to stabilize a zircon-type material. For example, refractories that are primarily xenotime-type materials typically exhibit creep rates on the order of at least about 10 times the creep rate of xenotime-stabilized zircon-type materials for the same temperature and pressure. Also, the melting temperatures of primarily xenotime-type materials are generally above 1900° C., while the decomposition temperatures of xenotime-stabilized zircon-type materials are typically on the order of 1800° C. Further, in terms of glass compatibility, primarily xenotime-type materials generally have less propensity to produce crystals at the refractory/glass interface than zircon-type materials. These enhanced properties typically result in higher long-term use temperatures for primarily xenotime-type materials compared to those of xenotime-stabilized zircon-type materials.

The third and fourth constituents (i.e., $SiO_2$ and $AO_2$), when used, can each constitute, on an oxide basis, from 1 to 49 mol % of the refractory. In the case of xenotime-stabilized zircon-type materials, the third and fourth constituents preferably constitute from 25-49 mol % of the refractory, e.g., the refractory can comprise approximately 37 mol % of each of the third and fourth constituents. Similarly, in the case of vanadate-stabilized zircon-type materials, the third and fourth constituents preferably constitute, on an oxide basis, from 25-49 mol % of the refractory, e.g., approximately 42 mol % of each constituent.

The refractories of the invention comprise at least one phase and typically, more than one phase. For example, the RP refractories can include one or both of the following phases:

(A) an $RPO_4$ phase that, on an oxide basis, consists of:
 (i) at least 30 mole percent $P_2O_5$; and
 (ii) at least 30 mole percent $R_2O_3$; and/or (B) an $RPO_4/ASiO_4$ phase that, on an oxide basis, consists of:
 (i) 2.5-13.0 mole percent $P_2O_5$;
 (ii) 2.5-13.0 mole percent $R_2O_3$; and
 (iii) the remainder $ASiO_4$;
  wherein (i) and (ii) are in a dissolved state in (iii).

The above phases are the preferred phases for the RP refractories, but other phases can be present as a result of, for example, partial reactions of the starting materials used to produce the refractories and/or decomposition of a starting material (e.g., decomposition of a zircon-type material in the stabilization process). For example, there can be one or more phosphorus rich phases, one or more $R_2O_3$-containing phases, and/or, in the case of xenotime-stabilized zircon-type materials, an $ASiO_4$ phase, one or more other silica-containing phases, and/or one or more other $AO_2$-containing phases.

Generally, between a $P_2O_5$ phase and an $R_2O_3$ phase, an $R_2O_3$ phase is preferred in terms of sintering and thus the creep rate of the final material. Although not wishing to be bound by any particular theory of operation, it is believed that an $R_2O_3$ phase serves as a grain boundary impurity getter during sintering. In particular, it has been found that RP refractories that are approximately 0.5 wt. % $R_2O_3$ rich tend to have lower porosity after sintering.

R'V refractories can include an $R'VO_4/ASiO_4$ phase that, on an oxide basis, consists of:
 (i) 1.0-20.0 mole percent $V_2O_5$;
 (ii) 1.0-20.0 mole percent $R'_2O_3$; and
 (iii) the remainder $ASiO_4$,
  wherein (i) and (ii) are in a dissolved state in (iii).

Other phases that may be present in R'V refractories include: one or more $V_2O_5$-rich phases, one or more $R'_2O_3$-containing phases, an $ASiO_4$ phase, one or more other silica-containing phases, and/or one or more other $AO_2$-containing phases.

In the case of an $ASiO_4$ phase and/or an $AO_2$ phase, whether in an RP or an R'V refractory, it is known in the art that $ThO_2$ has limited solubility in $ZrO_2$ and thus combinations of $ThO_2$ and $ZrO_2$ are limited to allowable solubilities. Similarly, other combinations of $ZrO_2$, $HfO_2$, $ThO_2$ are limited to those achievable based on solubilities.

The presence of a variety of phases results in overall contents of the first, second, third, and/or fourth constituents (or the vanadate first, vanadate second, third and fourth constituents in the case of R'V refractories) which, in general, are not stoichiometric. Thus, RP refractories will riot in general have overall compositions that exactly satisfy the compositional formula $RPO_4$ for the first and second constituents and similarly, R'V refractories will not in general have overall compositions that exactly satisfy the compositional formula $R'VO_4$ for the vandate first and vandate second constituents Likewise, R'V refractories and those RP refractories that include third and fourth constituents will not, in general, have overall compositions that exactly satisfy the composition formula $ASiO_4$ for the third and fourth constituents. The mol % ranges recited above and in the claims are in terms of individual constituents, rather than reacted constituents, to take account of these non-stoichiometric possibilities.

The refractories of the invention can be made in various ways. For example, one can start with a mixture of powders of the constituent oxides and then heat the mixture so that the constituents react to form the refractory. Other approaches for producing the refractories of the invention include sol-gel or flame pyrolysis techniques. When making larger batches of the refractories, it is important to make sure that the reaction times and temperatures are sufficient to achieve the desired reaction between the starting materials.

Because phosphorous oxides are volatile, it is preferred to initially heat the constituents to an intermediate temperature at which the phosphorous oxide will become sequestered by the other constituents, followed by heating to the reaction temperature, e.g., a temperature in the preferred range of about 1200° C. to about 1500° C. The heating is preferably performed in a covered crucible to avoid loss of the phosphorous oxide constituent. After the reaction is completed, the reacted material is cooled and then ground (e.g., ball milled) and sieved to a desired particle size, e.g., −325 mesh.

The resulting powder can then be used to make refractory parts using conventional ceramic processing techniques. See, for example, Reed, James S., *Principles of Ceramics Processing*, $2^{nd}$ Edition, Wiley Interscience, New York, 1995. For example, a green body can be formed using the powder by a process that comprises, for example, uniaxial pressing, isostatic pressing, extrusion, slip cast molding, gel casting, or a combination thereof. In particular, the green body can be formed with isostatic pressing, with low pressure isostatic pressing, or without isostatic pressing, as appropriate to the application. The green body, once formed, can be fired by a process that comprises atmospheric pressure firing, hot uniaxial pressing, hot isostatic pressing, or a combination thereof. In the case of refractories that are primarily xenotime-type materials, the firing is preferably performed at a temperature of at least 1650° C. To minimize sticking of the refractories of the invention to a setter used during firing, setters composed of platinum or zirconia are preferred.

In the case of stabilized zircon-type materials, rather than starting with the four constituents, one can start with a powder of a zircon-type material and react that with the first and second constituents, in the case of xenotime-stabilized zircon-type materials, or the vanadate first and vanadate second constituents, in the case of vanadate-stabilized zircon-type materials. A further alternative is to combine a powder of a zircon-type material with a powder of a xenotime-type material or a vanadate-type material. In this case, the mixed powders can be directly formed into a green body and fired, with the stabilization occurring during the firing.

The microstructure of stabilized zircon-type materials can be modified by post firing heat treatment. The heat treatment can consist of cooling slowly or soaking at a temperature in a two phase field of the material. See, for example, Ruoff, Arthur, *Materials Science*, Prentice-Hall, Englewood Cliffs, N.J., 1973, pages 129-130. In addition to the basic constituents, the refractories of the invention can also comprise various additional optional constituents. For example, as discussed in commonly-assigned U.S. Patent Publication No. 2004/0055338, in the case of stabilized zircon-type materials, the refractories can include $TiO_2$ in an amount greater than 0.2 wt. % and less than 0.4 wt. %. Other optional constituents including various sintering aids. Similarly, the refractories of the invention can and in general will include impurities from the raw materials and processing equipment used to make the refractories.

The refractories of the invention can be fired (sintered) at higher temperatures than can be used with, for example, non-stabilized zircon-type materials. As a result, higher densities, e.g., densities above 85% of the maximum theoretical density, can be achieved without the need for high pressure isopressing (e.g., isopressing at pressures above 10,000 psi). This can be an important advantage of the invention in many applications, such as the manufacture of isopipes for use in a fusion glass making process.

As will be evident to persons skilled in the art, a variety of other starting materials and reaction schemes can be used in the practice of the invention, the above being merely representative examples. For example, in the case of stabilized zircon, in addition to the reaction schemes used in the examples presented below, stabilized materials can be obtained by the reaction of zirconium phosphate with yttrium oxide and silica. More generally, rather than starting with oxides, one can start with other reactants known in the art, e.g., silicates, nitrates, etc. Along the same lines, rather than performing solid state reactions, liquid phase reactions can be used.

The RP and R'V refractories of the invention can be used in a variety of applications. A particularly important application is in the manufacture of glasses and glass-ceramics. As discussed below, it has been found that the RP refractories are compatible with the glasses used to make flat panel displays, such as liquid crystal displays. Accordingly, these refractories can be used in those parts of the glass making process where molten glass comes into contact with the refractory. In particular, the RP refractories can be used as all or part of an isopipe for use in a fusion downdraw process. When so used, the refractories can achieve a defect level in a finished display glass or a finished display glass-ceramic that is less than or equal to 0.1 defects per pound.

In general terms, the RP refractories of the invention can be used to form an entire piece of apparatus used in a glass or glass-ceramic manufacturing system or just part of the piece of apparatus. For example, the apparatus, e.g., an isopipe, can have a core and a coating where the coating contacts molten glass and covers all or part of the core, in which case the RP refractory of the invention can form all or part of the core and/or all or part of the coating. In cases where the RP refractory is used as a coating, the core can be a second refractory material. Examples of suitable materials for such a core include, without limitation, alumina, magnesium oxide, a spinel, titanium oxide, yttrium oxide, or a combination thereof. Other refractory materials that can be used for the core include zircon, silicon carbide, and zirconium oxide. The coating can be applied by standard methods for applying ceramic coatings, such as, flame spraying or plasma spraying.

In cases where the RP refractory is used as the core, the coating can comprise a second refractory material such as a refractory metal, a spinel, zircon, alumina, or a combination thereof. Examples of suitable refractory metals include platinum, molybdenum, rhodium, rhenium, iridium, osmium, tantalum, tungsten, and alloys thereof.

In addition to their use in isopipes, RP refractories can also be used to form all or part of the following components of glass or glass-ceramic manufacturing equipment which, in typical applications, come into contact with molten glass or molten glass-ceramic: pipes, vessels, channels, weirs, bells, stirrers, bricks, blocks, gates, walls, bowls, ladles, needles, sleeves, plugs, molds, rings, plungers, tweels, and the like.

It should be noted that when an RP material contains substantial amounts of a zircon-type material, then it may be desirable to keep the use temperature of the refractory below about 1280° C. for display type glasses, not because of creep considerations, but because zircon is soluble in glasses of these types at temperatures above about 1280° C., which can lead to the formation of defects in the final glass sheets (see commonly-assigned U.S. Patent Publication No. 2003/0121287).

While the RP refractories can be used in applications where the refractory comes into contact with molten glass or molten glass-ceramic, it has been found that R'V refractories, at least for display glasses, can cause a change in glass color. Accordingly, where such a color change is undesirable, these refractories are preferably used in locations where the refractory does not come into contact with molten glass or molten glass-ceramic, e.g., as crown refractory bricks.

In addition to applications where the refractory comes into contact with molten glass, both the RP and the R'V refractories can be used in applications where the refractory does not come into contact with molten glass or molten glass-ceramic including: furnace crowns, breastwalls, cross walls, and the like. In addition to applications in the glass making industry, the refractories of the invention can also be used in other industries where materials that are resistant to high temperatures and/or have high chemical durability are needed. In particular, the refractories of the invention can be used in applications where high levels of creep resistance are desirable, although they can be used in other applications where creep resistance is not critical.

With regard to the zircon-type materials hafnon and thorite, these materials have been used as constituents in glass encapsulations for nuclear wastes. Thus making refractories used to form such glasses out of forms of these materials which have been stabilized with xenotime-type materials can be beneficial.

In terms of preferred materials, the preferred zircon-type material is zircon (i.e., $ZrSiO_4$ with up to about 6.0 wt. % $HfSiO_4$), the preferred xenotime-type material is xenotime (i.e., yttrium phosphate or $YPO_4$), the preferred xenotime-stabilized zircon-type material is zircon stabilized with xenotime (xenotime-stabilized zircon), and the preferred vanadate-stabilized zircon-type material is zircon stabilized with yttrium vanadate (i.e., $YVO_4$). Between xenotime-stabilized zircon type materials and vanadate-stabilized zircon type materials, the xenotime stabilized materials are preferred. For ease of presentation, the following discussion, including the examples, is in terms of the preferred materials, i.e., zircon, xenotime, and xenotime-stabilized zircon. It is to be understood that the discussion of these preferred materials is only for purposes of illustration and is not intended to and should not be interpreted as limiting the scope of the invention in any manner. Rather, vanadate stabilized materials and/or other members of the various families of materials discussed above in Section II (Definitions) can be combined with or substituted for the preferred materials in the practice of the invention.

A. Zircon

Zircon ($ZrSiO_4$) is a naturally occurring material that is widely used as a refractory in glass making processes for its excellent chemical durability. As a material, zircon has an interesting combination of properties and has been extensively studied. See, for example, J. A. Speer, "Zircon", in *Reviews in Mineralogy, Ortho-Silicates*, published by Mineralogical Society of America, 5, Chapter 3, 67-112, 1980; and U. Schaltegger and P. Hoskin, *Reviews in Mineralogy, Zircon*, published by Mineralogical Society of America, 53, 2003.

The crystal structure of zircon is tetragonal and belongs to the space group 141/amd. It consists of chains formed from alternating units of edge-sharing $SiO_4$ tetrahedra and $ZrO_8$ bipyramids parallel to the crystal c-direction. The chains are linked to one another by edge-sharing bipyramids. Zircon shows a large birefringence, yet the expansion anisotropy is small, and the average coefficient of thermal expansion is only ~$42\times10^{-7}$ $K^{-1}$. See J. A. Speer, *Reviews in Mineralogy, Ortho-Silicates*, supra.

Figure 2:
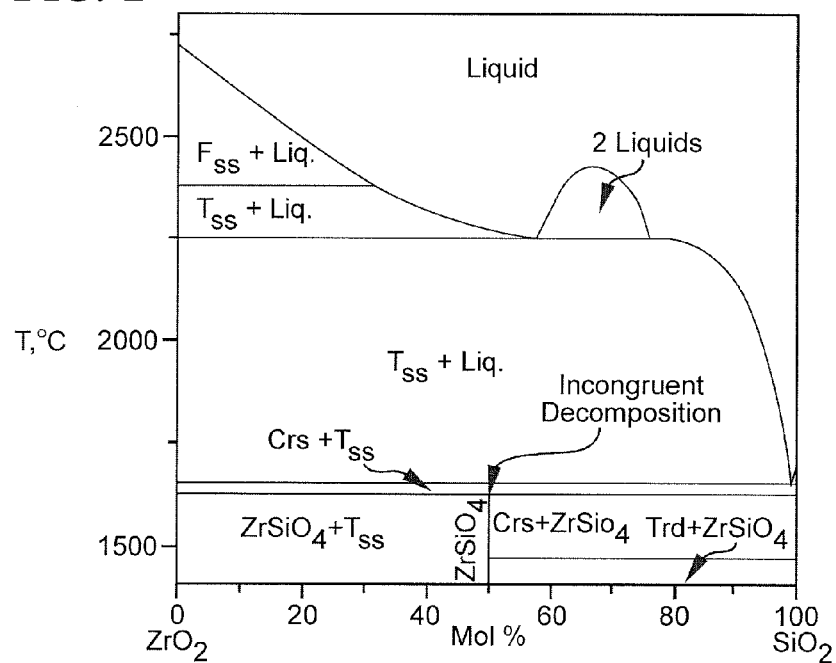
FIG. 2 is a phase diagram for the zirconium oxide-silicon oxide binary system that illustrates decomposition of zircon ($ZrSiO_4$) at ~1650° C. The kinetics of zircon formation are extremely slow, so the decomposition is for all practical purposes irreversible (see R. G. J. Ball, M. A. Mignanelli, T. I. Barry, and J. A. Gisby, "The Calculation of Phase Equilibria of Oxide Core-Concrete Systems," J. Nucl. Mater., 201 238-249 (1993).

Frequently, zircon cannot be used in situations where these properties of chemical durability and low expansion are important for two main reasons. First, zircon decomposes at temperatures above 1650° C. This is illustrated in the phase diagram for the zirconia-silica system shown in FIG. 2. See R. G. J. Ball et al., *J. Nucl. Mater.*, supra. Decomposition of zircon has been widely studied and is accelerated by presence of any impurities such as might already be present in naturally occurring zircon. See, for example, R. S. Pavlik, Jr. and H. J. Holland, "Thermal Decomposition of Zircon Refractories," *J. Am. Ceram. Soc.*, 84 [12] 2930-36, 2001; and J. M. Ayala, L. F. Verdeja, M. P. Garcia, M. A. Llavona, and J. P. Sanchez, "Production of Zirconia Powders from the Basic Disintegration of Zircon, and their Characterization," *J. Mat. Sci.*, 27 [2] 458-463, 1992. Decomposition is essentially irreversible as the kinetics of reaction of zirconia with silica to reform zircon are slow; further, silica tends to segregate away from the zirconia. Zircon cannot be processed or used above the decomposition temperature. For example, growth of birefringent single crystals of zircon for optical applications by melt processes is not possible.

Second, reaction and diffusion kinetics, as long recognized by geologists, are incredibly slow. See, for example, E. B. Watson and D. J. Cherniak, "Oxygen Diffusion in Zircon," *Earth and Planetary Letters*, 148 527-544, 1997; and D. J. Cherniak, J. M. Hanchar, and E. B. Watson, "Rare-Earth Diffusion in Zircon," *Chemical Geology*, 134 289-301, 1997. Formation of zircon even by sol-gel routes does not occur easily at temperatures below 950° C. Once formed, zircon is difficult to sinter to high density even with the assistance of cold isostatic pressing to increase green density. Processing of synthetic zircon is difficult and expensive.

Notwithstanding these drawbacks, as discussed above, zircon has been used to produce isopipes, a key component of the fusion draw process for making sheets of display glass. In large part, this choice has been driven by compatibility of the glass with zircon, a criterion of paramount importance as the isopipe and the molten glass are in direct contact with one another at elevated temperatures for a substantial period of time. Defects that might scatter light such as blisters, crystals, etc. must be held to a minimum.

Zircon's creep resistance at high temperature has also made it a suitable choice for the substrate sizes and glass types used to date in the display industry. However, as discussed above, there has been an ever increasing demand by display manufacturers for larger substrates and glasses with higher performance properties, specifically, glasses with lower susceptibilities to dimensional changes (e.g., compaction) as a result of heating during the display manufacturing process. High strain point glasses can provide the desired dimensional stability. However, because the fusion draw process operates over a narrow viscosity range of ~10,000 P at the weir to ~300,000 P at the root, a change to a high strain point glass requires an increase in the operating temperature of the isopipe in order for the high strain point glass to exhibit these viscosity values at the weir and root.

Isopipes made from commercially available zircon are not able to withstand these higher temperatures, while still having practical configurations (practical heights) and use lifetimes. For example, the intrinsic rate of creep for commercially available zircon has been observed to increase by a factor of 28 when going from 1180 to 1250° C. Accordingly, fusion formation of a glass substrate having a strain point that is ~70° C. higher than current glasses at the same width would require a 5.3 fold increase in the height of the isopipe to maintain even the most minimal of practical lifetimes. In addition to the increase in the rate of creep of zircon, the numbers and size of defects resulting from dissolution of zircon into the glass will increase with temperature. For these reasons, use of a zircon isopipe to fusion form higher strain point glasses is not likely to be practical.

Similarly, even at the temperatures used with current display glasses, commercially available zircon cannot be used to produce wider substrates without substantial decreases in lifetimes and/or substantial increases in heights. As will be evident, the deficiencies of commercially available zircon are even more pronounced in the case of larger substrates made of high strain point glasses.

B. Xenotime

Xenotime is a naturally occurring mineral frequently found in certain beach sands and has the nominal chemical formula $YPO_4$ although it usually contains a mixture of heavy rare earths. It is chemically stable in most geological environments and is used as a marker for dating of geological events. Xenotime has a reported melting temperature of 2150° C. W. Szuszkiewicz and T. Znamierowska, Pol. J. Chem., 63 [4-12] 381-391, 1989.

Like the mineral zircon, xenotime is designated as NORM (naturally occurring radioactive material) as it contains small amounts of Th and Ra. It is isostructural with zircon ($ZrSiO_4$) having yttrium and phosphorous atoms located at the zirconium and silicon sites. Xenotime and zircon belong to tetragonal I41/amd space group and have lattice parameters a=6.885 and c=5.982, and a=6.604 and c=5.979 Å, respectively. Despite less than a 3% difference in lattice volumes and similar lattice parameters, mutual solubility of xenotime and zircon is limited to ~12 m/o (mole percent on an oxide basis) at 1500° C. The difference in ion valences is responsible for the miscibility gap. See C. Tanner, K. Geisinger, and R. Wusirika, "Temperature and Wavelength Dependence of Refractive Indices of Zircon and Hafnon," *Optical Materials*, 26 305-311, 2004.

Figure 3:
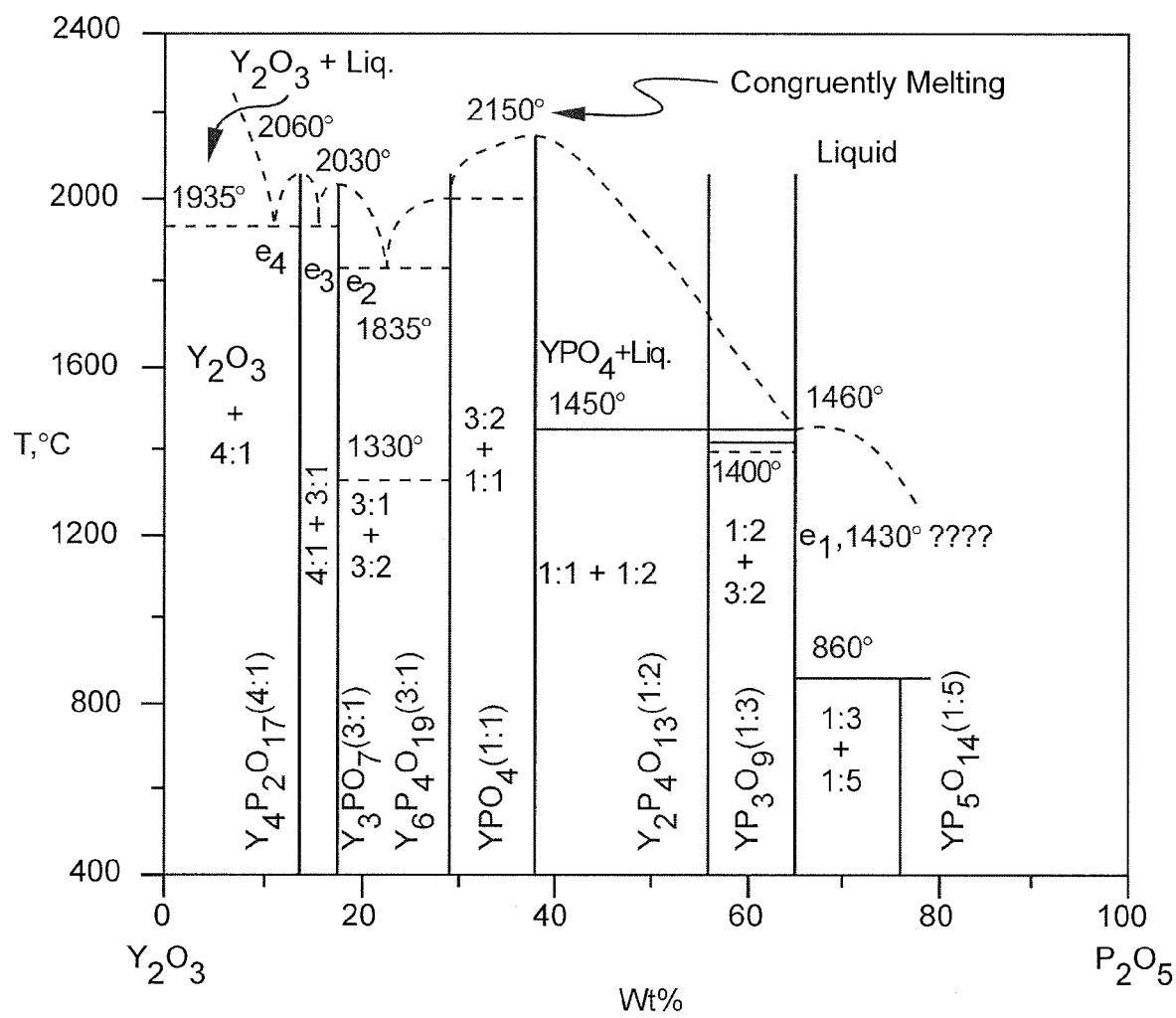
FIG. 3 is a binary phase diagram for the yttrium oxide-phosphorous oxide system showing congruent melting of xenotime ($YPO_4$) at 2150° C. (see W. Szuszkiewicz and T. Znamierowska, "Phase Equilibria in the System $Y_2O_3$—$P_2O_5$," Pol. J Chem., 63 [4-12] 381-391, 1989.

A phase diagram for the yttrium oxide-phosphorous oxide system is given in FIG. 3. A comparison of this phase diagram with the phase diagram of the zirconia-silica system (FIG. 2) shows that there are some important differences between the two systems that have a bearing on how xenotime can be synthesized, processed, and used. Xenotime melts congruently at ~2100° C., whereas zircon decomposes into zirconia and silica at 1650° C. There are numerous yttrium oxide-phosphorous oxide compounds, whereas zircon is the only compound that forms between zirconia and silica. Eutectics exist on both the yttria-rich (2000° C.) and yttria-deficient (1450° C.) sides of the xenotime composition. Zircon decomposes before it could coexist with a liquid. Decomposition of zircon is essentially an irreversible process because, as discussed above, reaction of zirconia and silica is inherently slow, and it is further hampered by segregation. Most impurities reduce the zircon decomposition temperature.

Although xenotime has been studied theoretically, it has not been used as a refractory material in commercial applications and, in particular, has not been used in the manufacture of glasses or glass-ceramics. A few references to xenotime occur in the patent literature. See U.S. Patent Application Publications Nos. 2002/0189496, 2003/0035907, and 2004/0020568. However, none of these references discloses or suggests that xenotime or a xenotime-containing material (or any other $RPO_4$ or $RPO_4$-containing material) can be used as a bulk refractory. To highlight the difference between these disclosures of xenotime and certain of the aspects of the present invention, a volume requirement of at least 200 cubic centimeters has been used. This volume represents a practical lower limit on the volume of a bulk refractory, e.g., it represents a practical lower limit on the volume of a refractory part or a green body for making a refractory part. In practice, refractory parts composed of the refractory materials of the invention will typically have much larger volumes. Thus, volumes of at least 500 cubic centimeters are preferred and volumes of at least 1000 cubic centimeters are more preferred. Much larger volumes are also included. As just one example, a typical isopipe having a length of 2 meters will have a volume of at least 400,000 cubic centimeters or more. The 200 cubic centimeter lower limit provides a convenient criterion for specifying use of the RP refractory materials of the invention (and the R'V materials) as a bulk refractory, a use not disclosed, recognized, or suggested in the art.

Without intending to limit it in any manner, the present invention will be more fully described by the following examples.

EXAMPLE 1

Preparation of Xenotime by a Solid State Reaction Route

Xenotime was prepared by a process designed to mitigate the corrosive, volatile and hygroscopic properties of $P_2O_5$. Pure powders of $Y_2O_3$ and $P_2O_5$ were TURBULA mixed for 60 minutes, calcined at 190° C. for 24 hours in a platinum crucible, and immediately reacted at 1200° C. for 24 hours in quantities to produce 3 kg of fired oxide.

The resultant powder was ground using alumina milling media and sieved to −325 mesh and confirmed by x-ray diffraction (XRD) to be xenotime. (Alumina milling media was also used in the other examples where powders were ground.) This xenotime powder was mixed with 6% METHOCEL and water as needed for direct extrusion into a ribbon. Pucks were punched from the extruded green ribbon and dried in a humidity controlled oven (95% relative humidity) for 48 hours. The dried pucks were fired at 1600° C. for 4 hours. Small pieces were removed from each puck for XRD to verify formation or retention of the desired phase after sintering.

Synthetic zircon ($ZrSiO_4$) and/or SG zircon reference material were used as references for comparison in various of the glass compatibility and creep tests reported below.

EXAMPLE 2

Preparation of Xenotime Using an Aqueous Route

Preparation of xenotime using an aqueous route was undertaken in order to study the effect of stoichiometry around the base $YPO_4$ composition. An aqueous route was selected as it offered superior mixing and compositional control as compared to solid-state routes. Stoichiometry of binary oxide compounds can have a significant effect on processing and final material properties. For example, $P_2O_5$-rich compositions may lead to formation of liquids at elevated temperature that effect sintering or result in loss of chemical stability in certain environments.

The aqueous route selected produced xenotime at comparably low temperatures by reaction of a yttrium nitrate hexahydrate solution with phosphoric acid. Four types of batches were prepared to produce 10 g of oxide powder starting with separate solutions of 50% $Y(NO_3)_3.6H_2O$ and 88% $H_3PO_4$. The batches differed in order of mixing and targeted final composition/stoichiometry as listed Table 1.

Precipitates formed almost immediately upon mixing the solutions for each batch. Formation of the precipitate was noticeably more rapid for the first batch. Batches were dried at 100° C. and samples of the powders were analyzed by XRD. The powders were crystalline in form and showed no discernable differences among the four batches. A match for the structures could not be identified in the JCPDS database. Nevertheless, it is hypothesized that the dried precipitate may be structurally similar to gypsum ($CaSO_4.2H_2O$).

The precipitates were calcined at 600 and 1000° C. for 4 hours in each case and again analyzed by XRD. Xenotime formed at 600° C. with only small quantities of $YPO_4.0.8H_2O$ present as a second phase. Formation of xenotime was complete by 1000° C. This is in stark contrast to the situation for preparation of zircon using aqueous or sol-gel routes where formation of zircon is preceded by zirconia. Under most conditions, reaction to form zircon only begins to occur at temperatures above 1000° C.

Figure 4A:
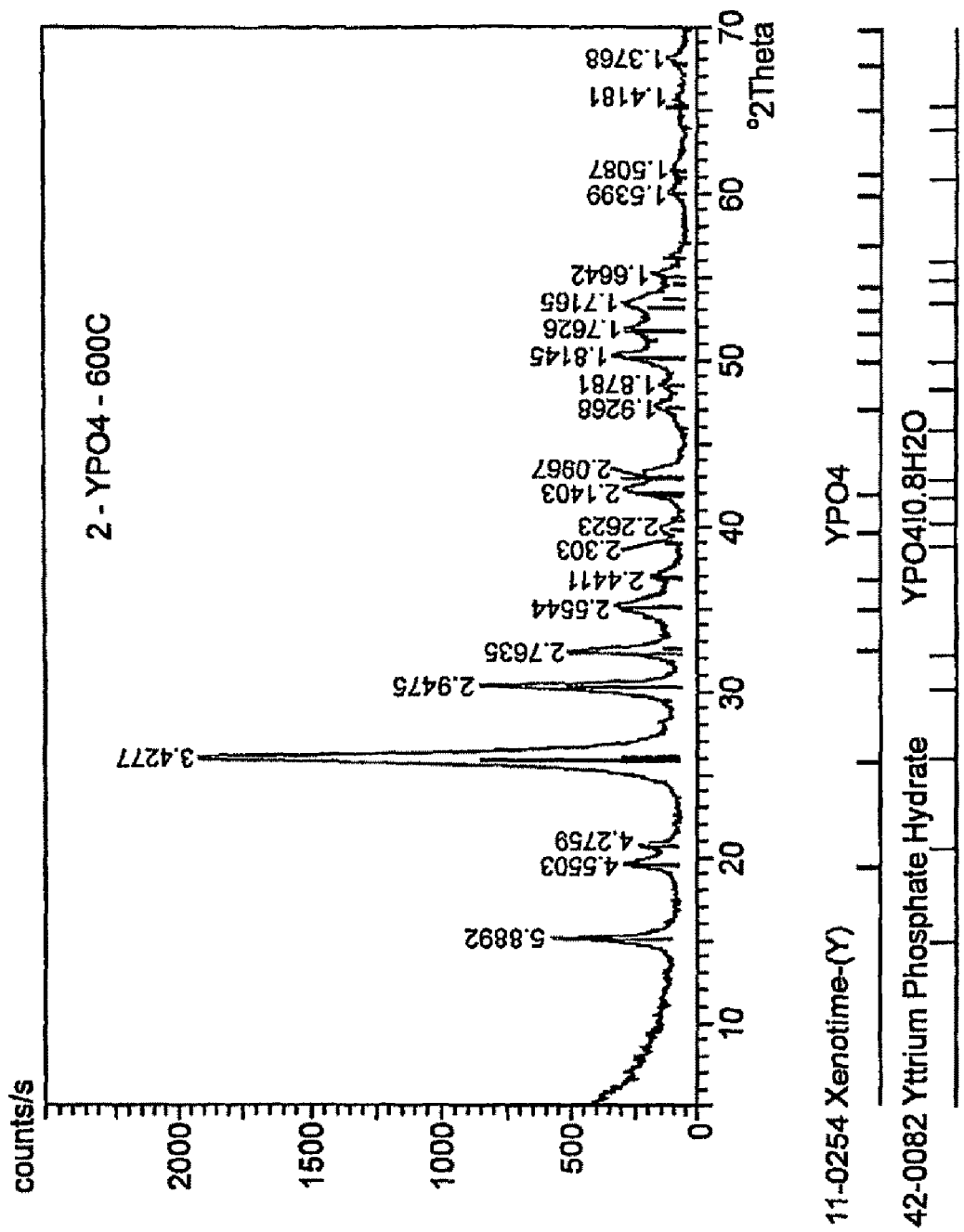
FIGS. 4A and 4B are XRD traces for $YPO_4$ obtained after calcination of precipitates from the reaction of yttrium nitrate hexahydrate with phosphoric acid (batch #2 in Table 1) at 600° C.
Figure 4B:
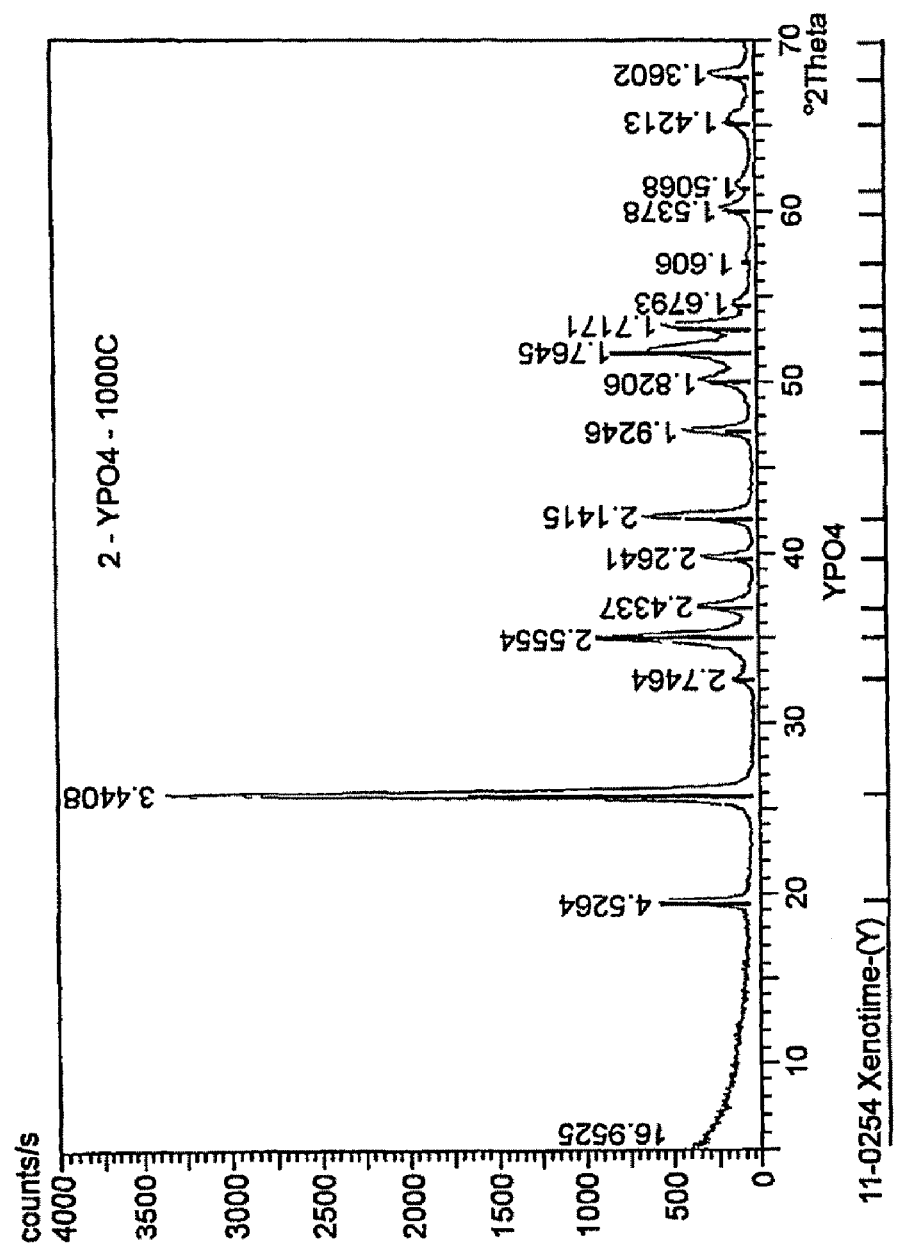
Figure 5A:
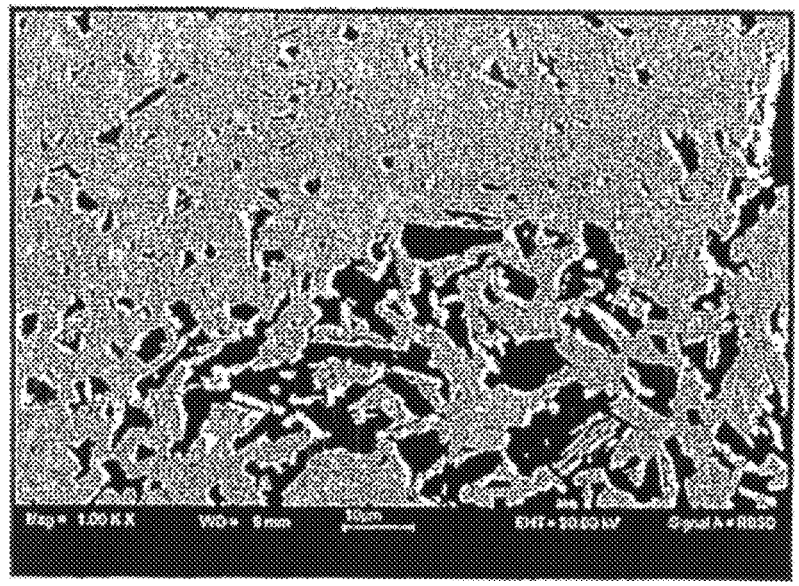
FIGS. 5A, 5B, 5C, and 5D are SEM photographs of yttrium phosphate compositions synthesized via an aqueous route after firing at 1750° C. for 4 hours.
Figure 5B:
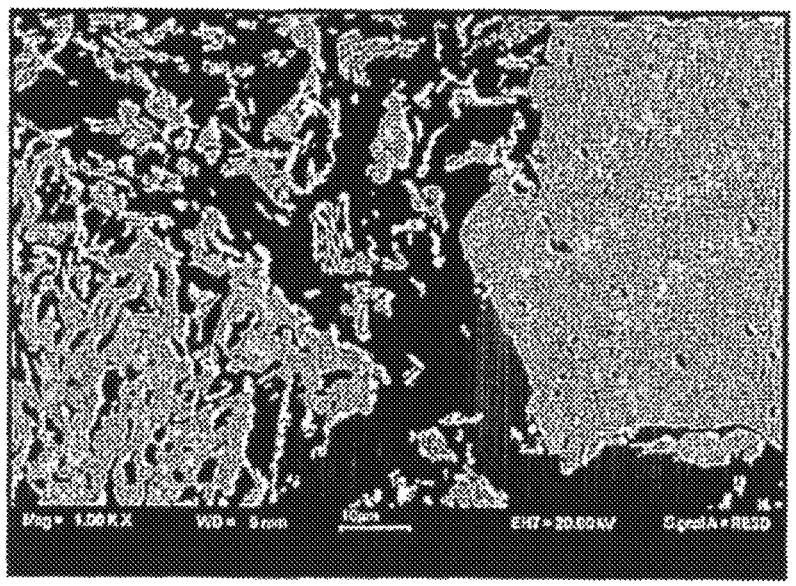
Figure 5C:
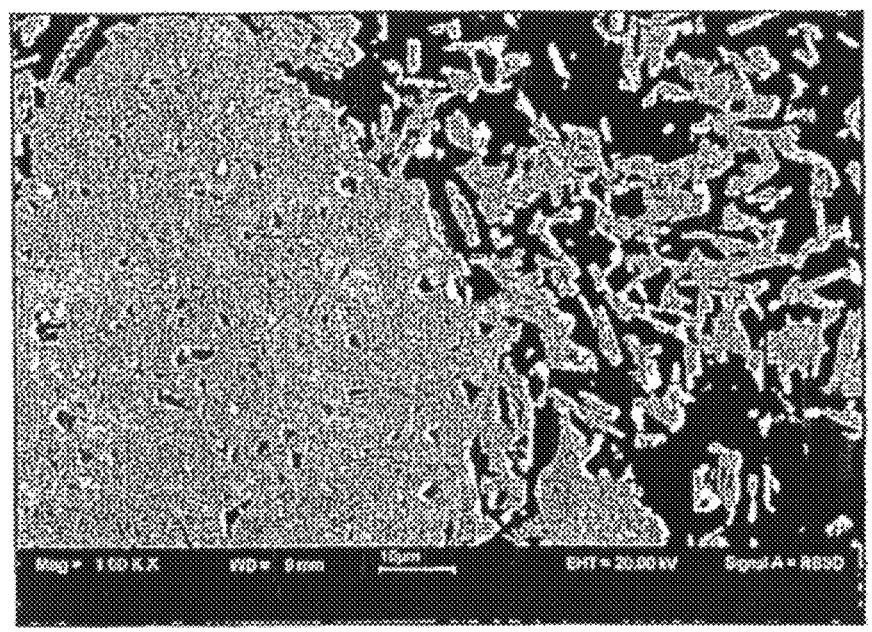
Figure 5D:
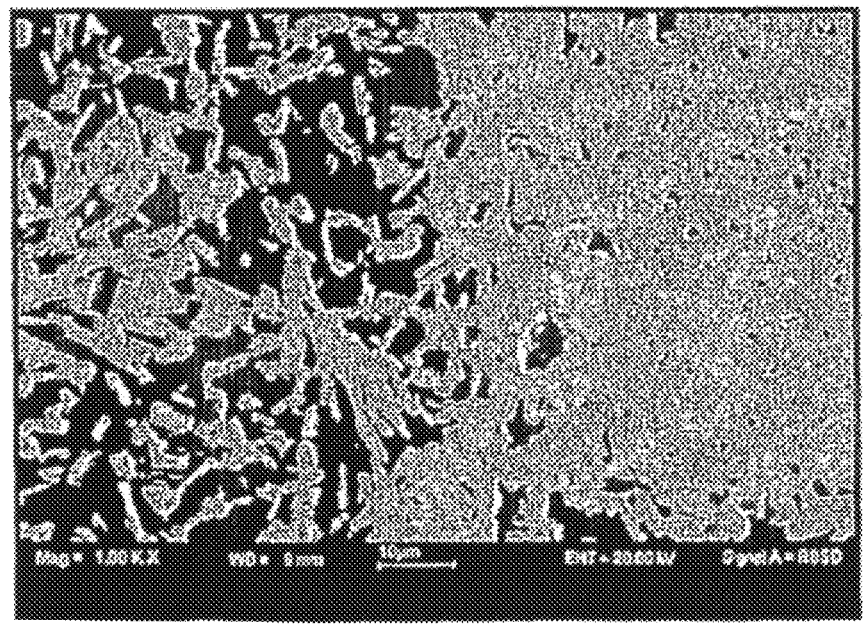

There was significant broadening of XRD peaks for the 600° C. calcination as compared to the 1000° C. calcination as shown in FIG. 4 for batch #2. The average size of particles was estimated using the method described by B. D. Cullity to be 160 Å after calcination at 600° C. and 320 Å after calcination at 1000° C. See B. D. Cullity, *Elements of X-Ray Diffraction*, Second Edition, published by Addison-Wesley Publishing Company, Inc., Reading, Mass., 1978, at pages 100 and 284.

Pills were uniaxially pressed from the powder dried at 100° C. and fired at 1750° C. SEM photographs of fired specimens are shown in FIG. 5. A second phase was detected in the sample from batch #3 by XRD. The second phase was also visible in SEM photographs (see FIG. 5C). That phase was identified by XRD to be $Y_2O_3$. (Note that this does not agree with the phase diagram in FIG. 3 which would predict formation of $Y_6P_4O_{19}$.) Xenotime was the only phase present in the other three batches. There were no shifts in lattice parameters that might point to generation of point defects. Excess phosphorous in batch #4 is believed to volatilize during firing leaving behind only $YPO_4$. Comparison of the results from batches #1 and #2 shows that order of mixing of solutions of yttrium nitrate and phosphoric acid does not affect the results.

EXAMPLE 3

Glass Compatibility Testing of Xenotime—Blister Test

Xenotime prepared in accordance with Example 1 was tested by being submerged at 1600° C. for 4 days under glass to assess refractoriness and blistering, and was then subjected to refractory gradient testing (see Example 4), where glass was pre-melted on a strip of xenotime and then held in a temperature gradient for 24 hours to evaluate secondary crystal formation. All testing was done using Corning Incorporated's EAGLE 2000 glass (see Example 14 of U.S. Pat. No. 6,319,867). Following these tests a stirred devitrification test was performed (see Example 6).

In the blister test, a puck of xenotime that measured approximately 2-3 inches in diameter by ½ inch thick was placed in the bottom of a platinum crucible and crimped into position. The remaining volume of the crucible was filled with glass cullet. Samples were then loaded into a furnace and held at 1600° C. for 96 hours, annealed, and cooled to ambient.

Samples from the blister test were inspected optically for defects in the glass such as blisters or crystals and for attack of the refractory as evidenced primarily by change of shape and surface roughness. The glass and refractory were core drilled out and the blisters in the boule were counted. The xenotime refractory was found to be intact after the testing. It exhibited significant blistering that was worse than that exhibited by SG zircon reference material tested under the same conditions.

Figure 6:
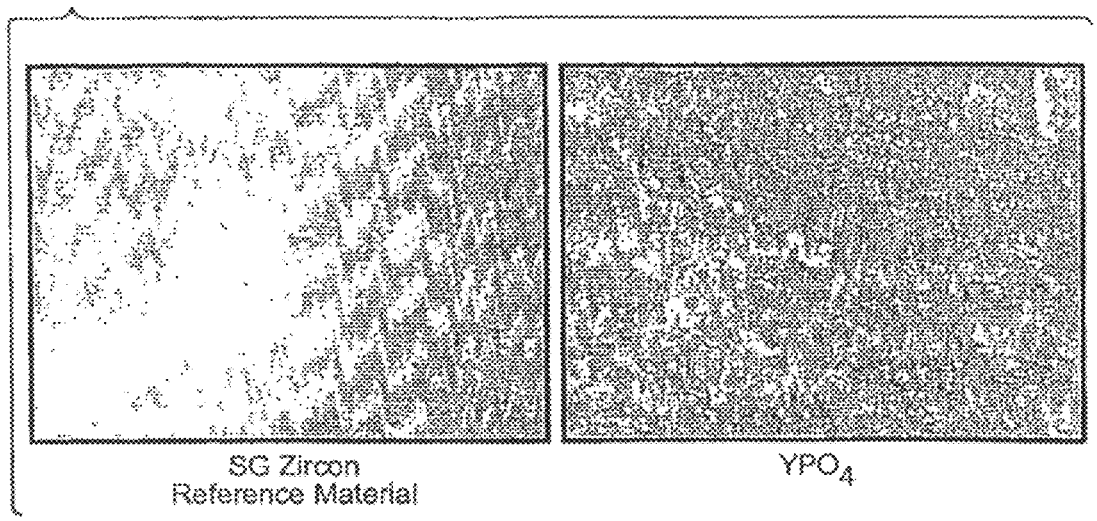
FIG. 6 contains two photographs which compare blistering of Corning Incorporated's EAGLE 2000 glass after contact at 1600° C. for 4 days with $YPO_4$ (right hand photograph) and the SG zircon reference material (left hand photograph).

FIG. 6 shows photographs looking through the glass onto (1) a specimen of $YPO_4$ (right hand photograph) and (2) a specimen of the SG zircon reference material subjected to the same blister test (left hand photograph). The difference in blister count is clear. However, as discussed in detail below, blisters were no longer seen under stirred conditions that are more representative of the type of conditions that exist during an actual fusion draw.

Figure 7:
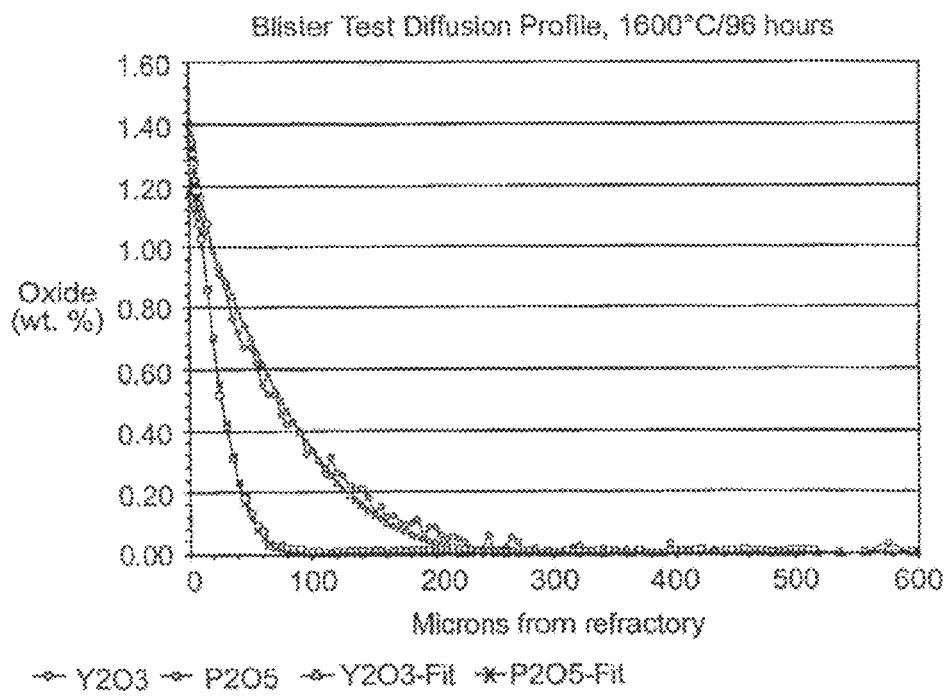
FIG. 7 is a plot of concentration profiles of $Y_2O_3$ and $P_2O_5$ in a display glass (EAGLE 2000 glass) as a function of position in a blister test specimen moving perpendicularly away from the glass-$YPO_4$ interface. The blister test was conducted at 1600° C. for 96 hours.

The $YPO_4$-EAGLE 2000 interface was examined by electron microprobe analysis. The inspection showed the interface region to be clear of blisters and that the refractory indeed had survived exposure to the glass. Concentrations of yttrium and phosphorous oxide were measured as a function of position moving in a direction perpendicular and away from the interface. The concentration profiles are plotted in FIG. 7. Diffusion constants and saturation concentrations of both species at the interface were obtained by regression analysis of the data using the semi-infinite diffusion model. The diffusion constants were determined to be 0.0124 and $1.17 \times 10^{-3}$ $\mu m^2/s$, and interfacial concentrations were found to be 1.2 and 1.45 w/o (weight percent on an oxide basis) for $Y_2O_3$ and $P_2O_5$, respectively.

For comparison, saturation solubility and diffusion coefficients of zirconia from zircon in Corning Incorporated's Code 1737 display glass have been measured in the temperature range 1100-1350° C. At 1350° C., solubility and diffusion coefficient of zirconia were 0.32 w/o and 1.6 $\mu m^2/s$. A direct comparison of these values with the yttrium phosphate values set forth above is not possible for two reasons. First, the diffusion data were measured in different glasses. Second, the data were collected over different and non-overlapping temperature ranges. Nevertheless, some comparison can be made since the compositions of the EAGLE 2000 and 1737 glasses are similar in that both are hard alkaline earth silicates with generally comparable amounts of boron oxide and alumina.

When compared, it can be seen that the diffusion coefficients and solubilities of $Y_2O_3$ and $P_2O_5$ from xenotime into EAGLE 2000 glass are slower and lower at 1600° C. than those of zirconia at 1350° C. into 1737 glass. These results indicate that in an isopipe application, xenotime should erode more slowly and that any diffusion into the glass should occur over a shorter distance than zircon. The reduced solubility and slower rate of diffusion of $Y_2O_3$ and $P_2O_5$ further indicate reduced growth of either primary or secondary crystals from either of these components relative to growth of zircon from dissolved zirconia. In particular, growth of secondary crystals in the xenotime/EAGLE 2000 system was found to be much more difficult than in the zircon/EAGLE 2000 system.

EXAMPLE 4

Glass Compatibility Testing of Xenotime—Strip Gradient Test

Compatibility of xenotime with EAGLE 2000 glass was evaluated as a function of temperature under static conditions using a strip gradient test. Samples of glass and xenotime in contact with one another were held in a temperature gradient. Position on the specimen was referenced to temperature with the help of a temperature map of the gradient. The purpose of the gradient was to quickly determine at what temperatures defects may occur in the glass or where the refractory is attacked.

Samples for the test were bar-shaped and were extruded at the same time using identical procedures and conditions as used to prepare the ribbon used in the blister tests of Example 3. Cross sectional dimensions of the die were ~0.25×0.5 inch and parts were cut to ~10 inch length segments. The bars were fired at 1650° C. for 4 hours.

The refractory strip gradient was run against EAGLE 2000 glass doped with 0.4 w/o $ZrO_2$ and 0.1 w/o $SnO_2$ to accelerate secondary zircon and cassiterite formation. Solid strips of glass were assembled on the refractory strip in a platinum boat, premelted at 1400° C. for 1 hour, and then held in the gradient for 24 hours. The boat was then quenched to room temperature and, at ambient conditions, thin sections through the refractory and the glass were prepared and examined petrographically. Table 2 shows temperature at the position of each thermocouple along the gradient.

Figure 8:
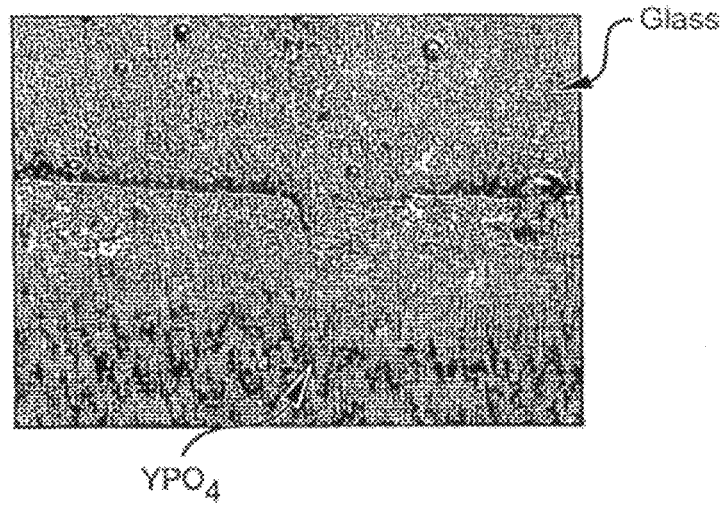
FIG. 8 is a photograph (125x) of an interface between yttrium phosphate and glass at a position corresponding to a temperature of ~1328° C. in a strip gradient test.

No crystals were found at the interface through the entire range of the gradient during the petrographic analysis. FIG. 8 is an optical image of the interface at the position corresponding to a temperature of 1328° C. There was an opal effect from ~1270° C. up to the 1469° C. maximum temperature. This effect appears to be a true opal glass of two liquids, rather than one crystallizing. The opal interface was not seen in the blister testing at 1600° C., so the liquid immiscibility field may not extend to that temperature. A count of blister defects is given in Table 3. Although some blisters are present, the number is significantly reduced as compared to the blister test conducted at 1600° C. It is believed that blistering may be due to reaction between a phosphate-containing interfacial layer and the bulk glass. If so, it is an artifact of the static test conditions and would not be an issue in the flowing glass environment of an isopipe.

A sample of SG zircon reference material run under identical conditions produced comparable results: no secondary crystals and minimal blistering. The zircon test showed cristoballite crystals in the glass below the known liquidus of EAGLE 2000 glass.

EXAMPLE 5

Glass Compatibility Testing of Xenotime—Compatibility with Common, Individual Oxides Used in Display Glasses A third strategy employed to assess the compatibility of xenotime with display glasses was to examine its interaction with individual glass components. Table 4 lists various oxides and a possible reaction with xenotime. Each of these oxides was mixed either as the oxide directly or as carbonates in the case of sodium and calcium with xenotime using a mortar and pestle. The xenotime in this study was 0.5 w/o $Y_2O_3$ rich, but the slight excess of $Y_2O_3$ was not believed to affect the outcome of the study.

The mixtures were double calcined/reacted at high temperature in alumina crucibles with an intermediate regrind. Samples were analyzed by XRD following reaction, and Table 4 gives a summary of the results. Xenotime was found to be stable in contact with all of the oxides except for $Na_2O$ and $CaO$. Other alkaline and alkaline earth oxides such as $K_2O$ or $BaO$ that were not studied are likely to react with xenotime in the same way as $Na_2O$ and $CaO$. Although not wishing to be bound by any particular theory of operation, it is believed that to the extent that xenotime may interact with display glasses, alkaline earth oxides may play a role in such interaction.

EXAMPLE 6

Glass Compatibility Testing of Xenotime—Stirred Devitrification

Having passed the foregoing tests, xenotime was subjected to the more sensitive stirred devitrification test.

The stirred devitrification test simulated glass flowing over the root of an isopipe. A stationary 12 mm diameter refractory finger (approximately 6 inches in length) was immersed in a crucible of EAGLE 2000 glass which was rotated at 0.143 rpm for 72 hours in a gradient furnace. The temperature of the refractory finger ranged from ~1158° C. at the glass surface to ~1130° C. at the lower end of the finger. The finger was removed from the glass, cooled rapidly, longitudinally cross-sectioned, and the interface examined for crystal growth.

The sample of xenotime used in this test was prepared by cold isostatic pressing of xenotime powder (Sample D; see Exhibit 8 below) in a 2 inch diameter 8 inch long cylindrical mold to 20 kpsi. The billet was fired for 4 hours at 1750° C. Porosity was estimated from fired dimensions and weight to be approximately 5-8%. The finger for the test was core drilled from the billet.

Figure 9A:
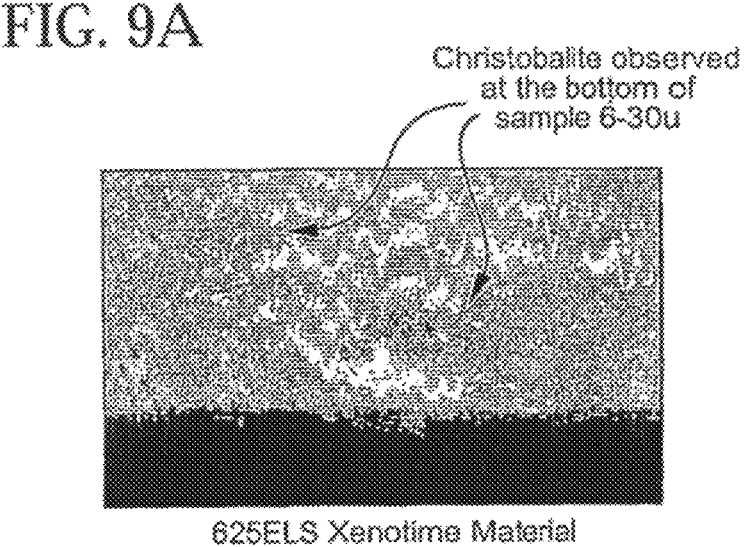
FIGS. 9A and 9B are optical micrographs of glass-refractory interfaces for specimens subjected to a stirred devitrification (moving glass) test (see Example 6).
Figure 9B:
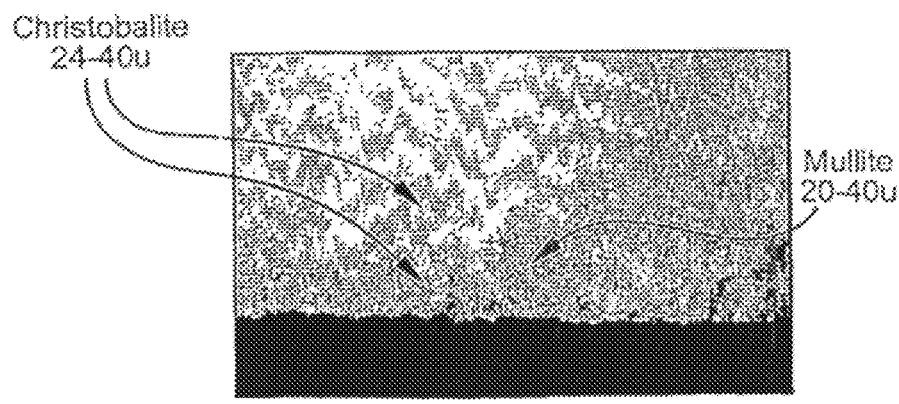

As shown in FIG. 9, the interface of the $YPO_4$ was as free of secondary crystal growth as the SG zircon reference material, with less detachment of refractory grains. There was some mullite growth from alumina contamination in the $YPO_4$ that occurred during the grinding process used to prepare xenotime powder. Both xenotime and the SG material had cristobalite crystals in the glass below ~1135° C., which is the normal devitrification phase for EAGLE 2000 at the normal liquidus temperature. Xenotime appears to have no deleterious effect on the liquidus of EAGLE 2000 glass. No blisters were visible in the glass for this moving glass test condition. This demonstrates compatibility with EAGLE 2000 display glass.

In summary, the results of these four tests (Examples 3-6) indicate that xenotime has characteristics which should meet the compatibility requirements for an isopipe that is in contact with flowing glass. The quality of glass products produced using a xenotime isopipe should be at least comparable to that of products produced using the SG zircon reference material. Secondary crystal defects were not observed to form on xenotime in either the strip-gradient or stirred-devitrification tests. Although blister count was high for tests conducted under static conditions, blisters were not observed under the dynamic conditions of the stirred test which is more representative of actual production conditions.

EXAMPLE 7

Phosphorous Volatilization

Significant phosphorous volatilization from oxide compounds at high temperatures has been described in the literature for some materials. Volatility of phosphorous increases with temperature and the reducing nature of the surrounding atmosphere. Volatilization can affect processing and use conditions for such materials.

No evidence of phosphorous volatility from xenotime was observed even for firing temperatures as high as 1750° C. in a reducing atmosphere. As a further test, xenotime was exposed to forming gas at 1700° C. for 4 hours and analyzed by powdered XRD to verify that no new or additional yttrium oxide phases formed. All possible combinations of the following conditions were examined: powdered and sintered xenotime (0.5 w/o $Y_2O_3$ rich $YPO_4$; Sample D; Example 8 below), platinum and alumina crucibles, covered and uncovered crucibles. Results showed that no increase in a $Y_2O_3$-rich second phase occurred for any of the samples under the various conditions.

EXAMPLE 8

Preparation of Xenotime Samples for Flexural Creep Testing

Although extrusion was used to prepare samples for blister and strip gradient compatibility tests, those tests could accommodate some internal defects such as macropores, i.e., a pore with a size significantly larger than a grain or an agglomerate size of the raw oxide materials used during formation of the part. Sources of macropores may be undissolved, large pieces of a binder, e.g., METHOCEL, inadequate degassing, drying issues, etc. Presence of these types of defects in creep samples would give incorrect rates of creep, i.e., larger than actual rates.

Billets for machining into specimens for creep measurements were therefore formed by cold isostatic pressing powers of already formed $YPO_4$ powder in an 8 inch long and 2 inch diameter rubber mold. No binders were used.

Four batches of yttrium phosphate were prepared using a target batch size of 2 kg. The four batches (samples) are listed in Table 5, and differ from one another in stoichiometry and calcination temperature. Samples A and C were designed to give a precise one-to-one yttrium to phosphorous ratio while Samples B and D were 0.5 w/o $P_2O_5$ deficient. Stoichiometry was then crossed with two different reaction temperatures, 1200 and 1475° C. According to the phase diagram for the $Y_2O_3$—$P_2O_5$ system shown in FIG. 3, no liquid should persist above 1475° C. for the $Y_2O_3$-rich compositions.

Each batch was TURBULA mixed for 60 minutes, calcined at 190° C. for 24 hours followed by (1) reaction for 24 hours at the specified temperature, (2) grinding, and (3) sieving through a −325 mesh screen. Parts were cold isostatically pressed in the above rubber molds at 20 kpsi and fired at 1650° C. In none of the four cases was there any evidence of liquid formation. Furthermore, the phosphorous rich composition synthesized by reaction of yttria and phosphoric acid described in Example 2 above also did not show presence of such a phase in XRD or SEM.

Open pores were present in parts sintered at 1650° C. The sintering temperature for samples used in the measurement of creep and other properties was therefore increased to 1750° C. to lessen the adverse effect of porosity. Sintering times for billets of Samples C and D were 4 hours. Billets of Samples A and B were both fired at 1650° C. for 4 hours and refired at 1750° C. for 4 hours.

EXAMPLE 9

Flexural Creep Testing of Xenotime Samples

Flexural creep measurements were performed on bars of Samples C and D that were machined to the dimensions of 2×4×100 mm. The zircon reference samples used as the basis of comparison were machined from the interior of a used zircon isopipe made from the SG material. Creep measurements were performed using a standard three point arrangement. The length of the span was three inches with 1000 psi applied at the center point. A creep test run consisted of one specimen each of Sample C, Sample D, and the zircon isopipe material, and two runs were performed to confirm accuracy of the results. The results of the test are summarized in Table 6.

Figure 10:
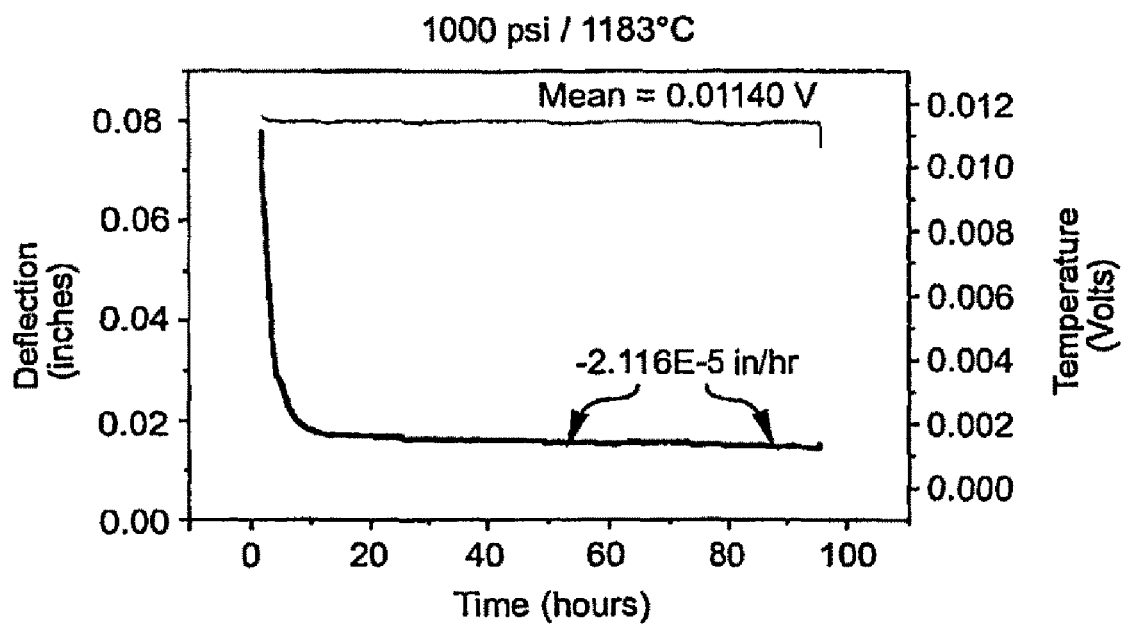
FIG. 10 is a plot of deflection versus time for the creep test of xenotime Sample D fired at 1750° C. (run #1).
Figure 11:
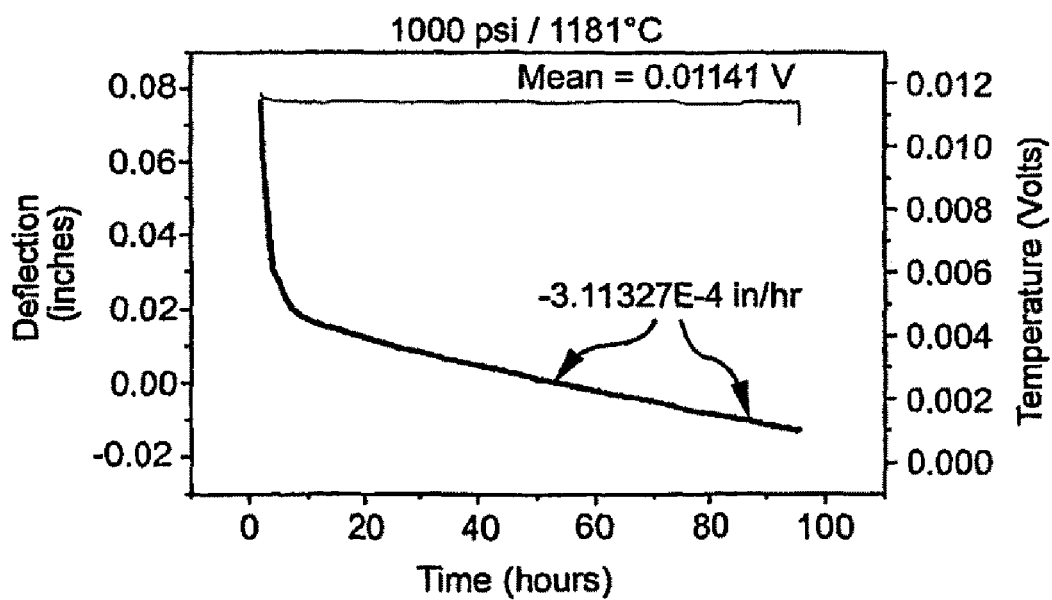
FIG. 11 is a plot of deflection versus time for the creep test of SG zircon reference material (run #1).
Figure 12:
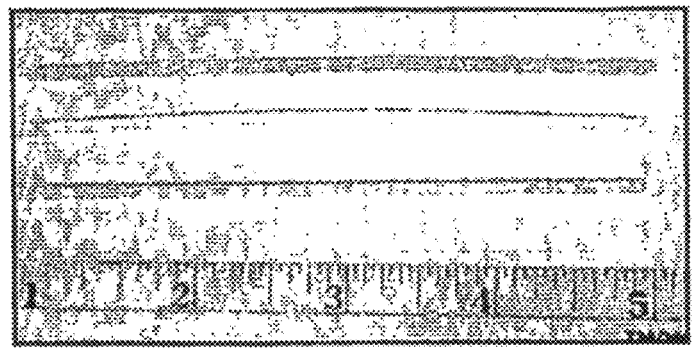
FIG. 12 is a photograph of samples after creep measurement: top—SG zircon reference material, middle—xenotime Sample C, and bottom—xenotime Sample D. Major divisions on the ruler shown in the photograph are in units of inches.

The rate of creep of Sample D is a factor of 15 improvement over the zircon isopipe material. The rate of creep for Sample C is less than that of zircon by approximately a factor of two. Actual deflection curves for the creep tests are shown in FIG. 10 for Sample D and in FIG. 11 for the zircon isopipe material. FIG. 12 is a photograph of the specimens after testing, where the top bar is the zircon material, the middle bar is Sample C, and the bottom bar is Sample D. The difference in final deflection between Sample D and the zircon isopipe material is immediately apparent on examination of FIG. 12.

Figure 13:
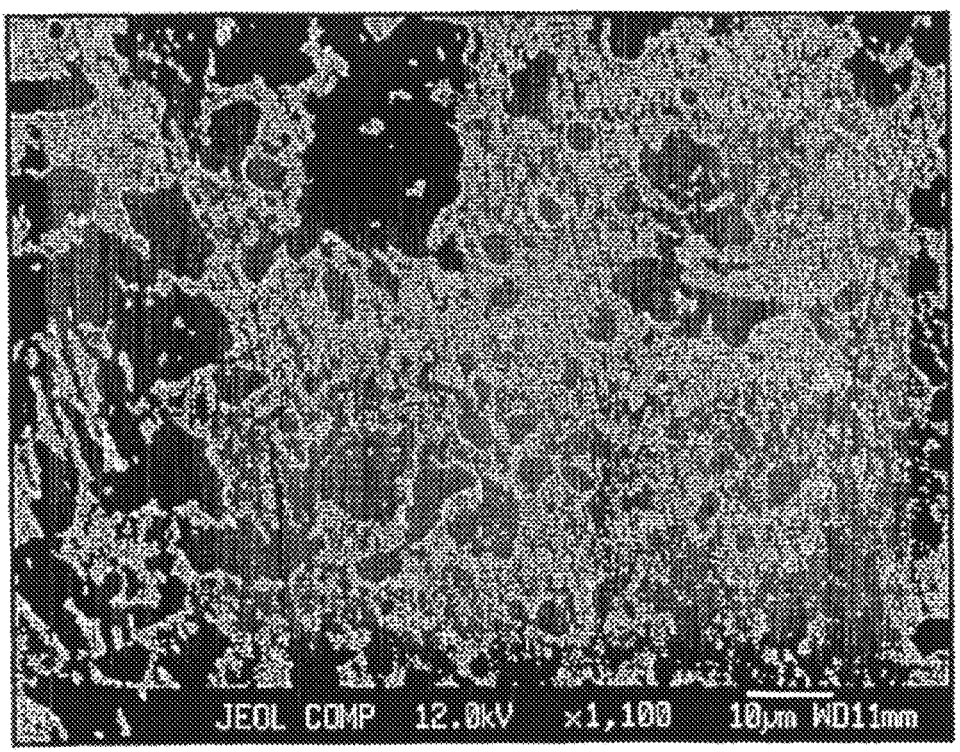
FIG. 13 is an electron microprobe photograph of a polished cross-section of a creep sample composed of xenotime Sample C.
Figure 14:
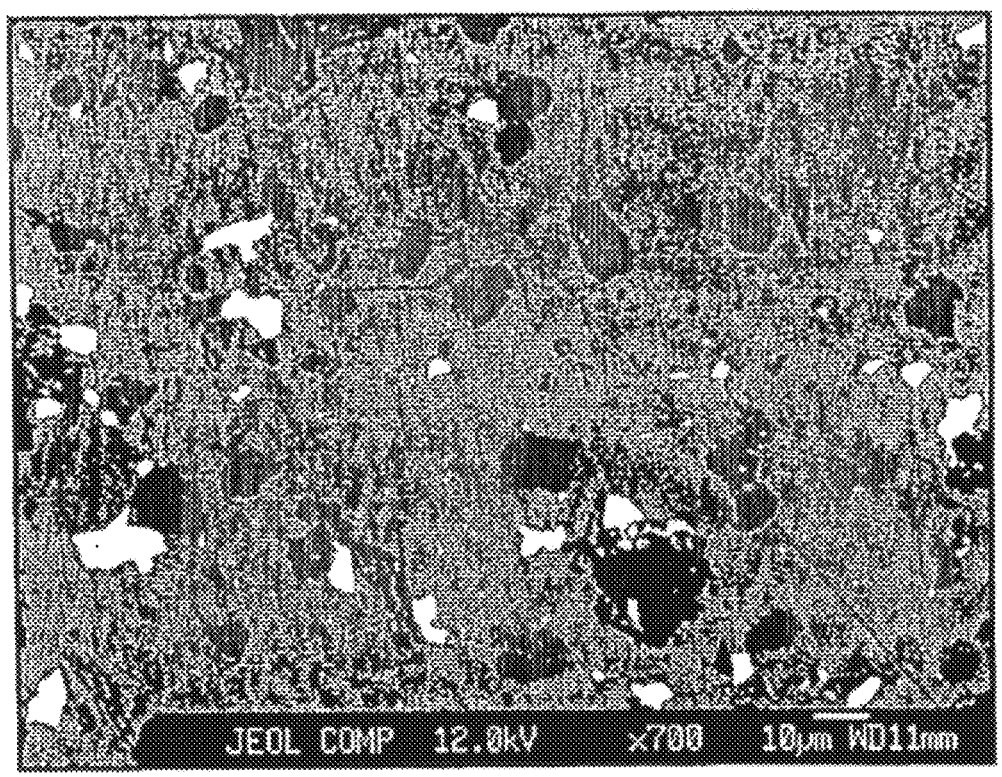
FIG. 14 is an electron microprobe photograph of a polished cross-section of a creep specimen composed of xenotime Sample D. White phase is a $Y_2O_3$-rich phase.
Figure 15:
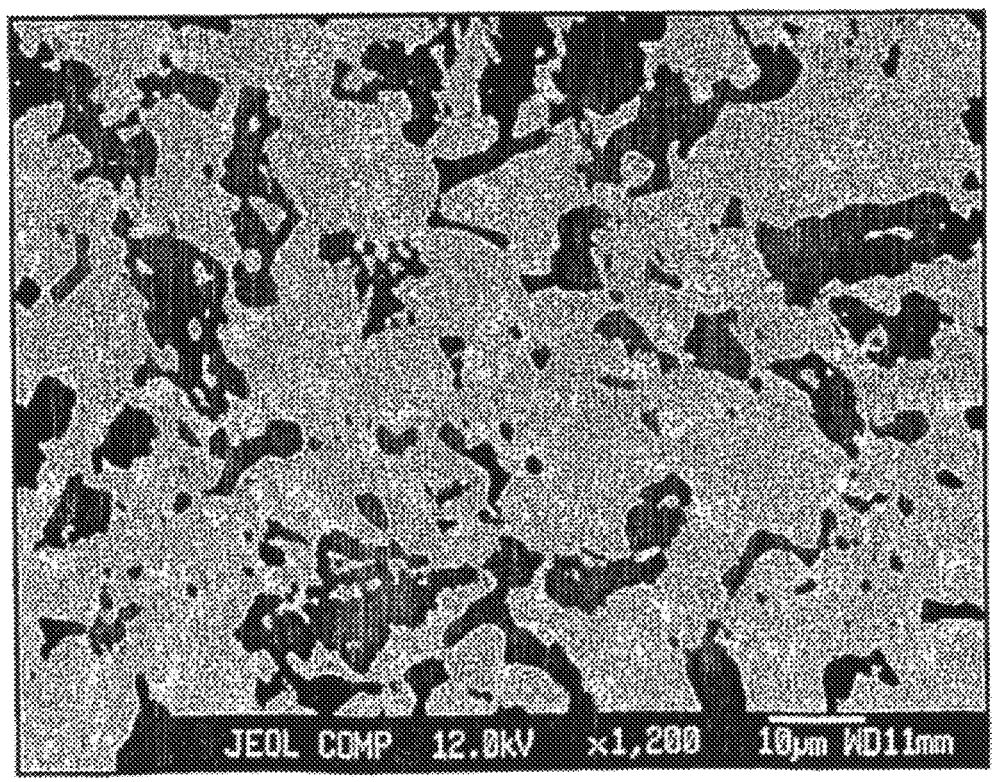
FIG. 15 is an electron microprobe photograph of a polished cross-section of a creep specimen composed of SG zircon reference material.

SEM photographs of the microstructure of Sample C, Sample D, and the zircon isopipe material are shown in FIGS. 13, 14, and 15, respectively. Average grain size for all three materials is similar at ~10 μm. The primary differences evident in the microstructures are the dramatically higher porosity of the Sample C specimen and the presence of minor quantities of a $Y_2O_3$-based second phase in the Sample D specimen. Porosities of the three specimens were measured by image analysis to be 25 (Sample C), 8 (Sample D), and 13 percent (zircon). Electron microprobe analysis of the $Y_2O_3$ rich particles in Sample D gave the following composition in cation percent: 68.7% Y, 20.2% P, 0.4% Zr, 9.8% Si, and 0.8% Al. Although not wishing to be bound by any particular theory of operation, it is believed that the second phase particles may act to collect silica and alumina impurities from the grain boundaries where they would otherwise accelerate creep. The more rapid rate of creep for Sample C, however, is more likely due to high level of porosity as compared to Sample D, a hypothesis confirmed by further creep testing as described below.

Creep measurements were conducted as a function of temperature on specimens from the Sample B billet in a three point configuration and accelerated by use of 250 and 1000 psi loads. In this case, specimens were machined to a larger geometry of 150×5×3 mm. The longer length increased the deflection and thus improved the accuracy of the creep measurement. The density of Sample B was computed directly from the weight and dimensions of the specimens to be 95% of theoretical (5% porosity). A lot of SG zircon reference material which had been shown to have a particularly low rate of creep was used as the reference (hereinafter referred to as "low creep zircon"). Table 7 summarizes the results, and FIG. 16 is a plot with respect to temperature.

Figure 16:
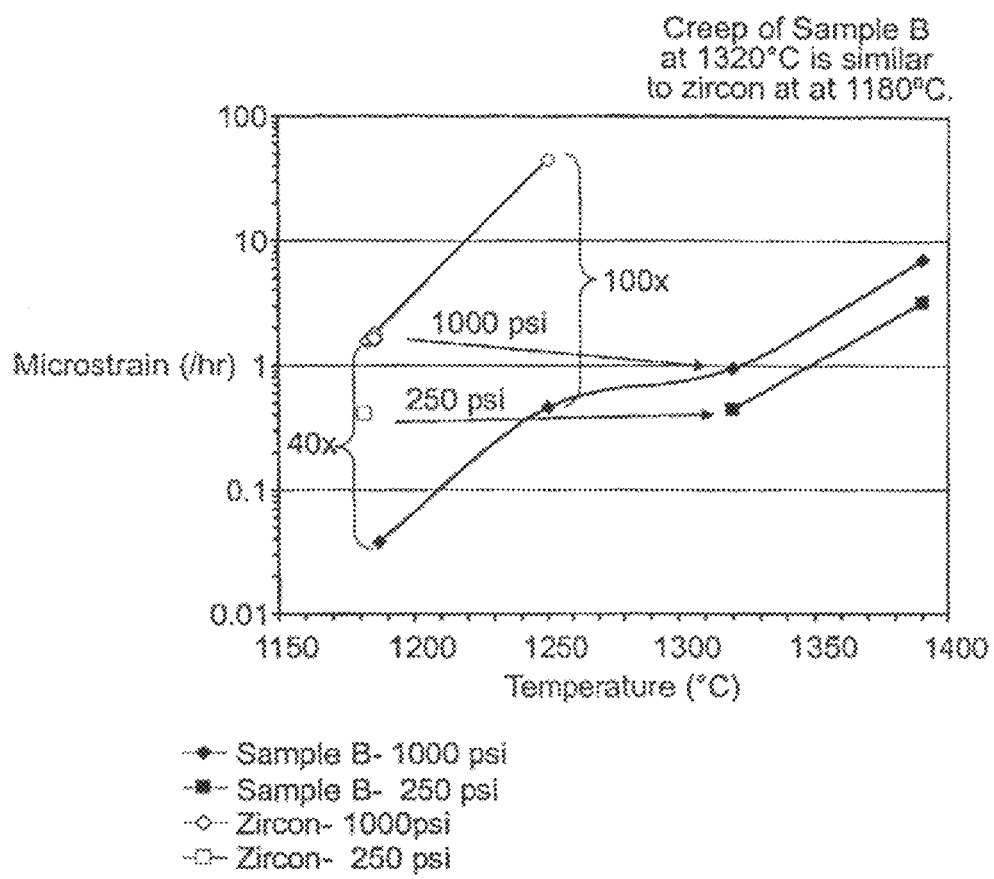
FIG. 16 is a plot of intrinsic rate of creep of xenotime as a function of temperature as compared to a lot of SG zircon reference material which exhibited especially low levels of creep.

As can be seen in FIG. 16, the rate of creep of Sample B under a 1000 psi load at around 1180° C. is a factor of 40× lower than for the low creep zircon sample. This xenotime composition can thus exceed the 16-fold reduction in intrinsic creep needed to enable a 2× longer isopipe without sacrificing lifetime. The data in Table 7 and FIG. 16 further show that the creep of Sample B is still lower at 1320° C. than low creep zircon at 1180° C. A xenotime isopipe can thus operate at higher temperature to enable fusion draw of a higher strain point glass, suitable for use in poly-silicon display manufacturing processes, at current isopipe lengths without a sacrifice of lifetime.

Figure 17:
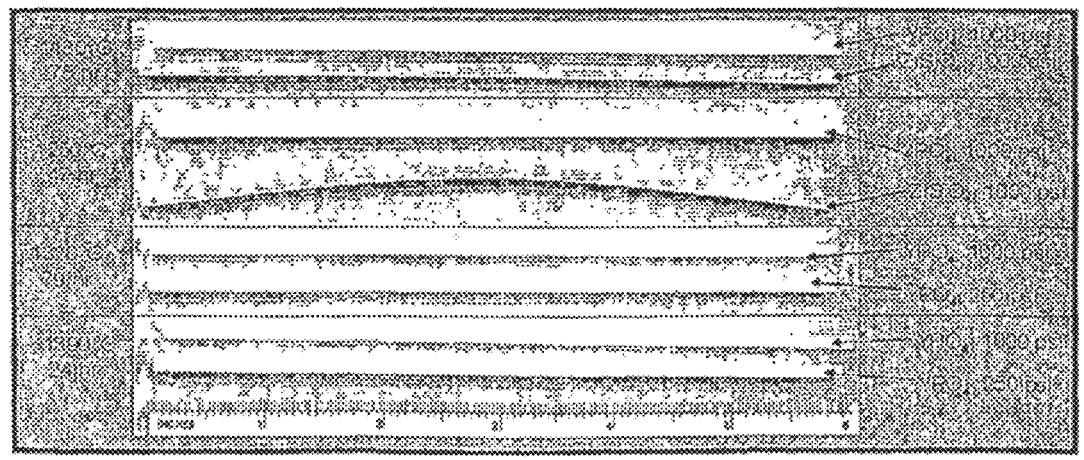
FIG. 17 is a photograph of creep specimens of Sample B ($YPO_4$) and SG zircon reference material (lot which exhibited especially low levels of creep; $ZrSiO_4$) after creep testing at a variety of loads (pressures and temperatures).

Photographs of the specimens that illustrate the dramatic difference in deflection, especially at 1250° C., between Sample B and the low creep zircon are shown in FIG. 17.

EXAMPLE 10

Thermomechanical Properties of Xenotime Samples

Thermomechanical properties of an isopipe material also play an important role in the design, startup procedure, and use conditions of an isopipe. Accordingly, the properties of flexural strength, stiffness, elastic modulus, and thermal shock tolerance were measured and compared to those of zircon. The parameter values were found to be quite similar to zircon.

Extra creep specimens of Sample B and the low creep zircon material were used as samples for measurement of modulus of rupture in a four-point arrangement. The creep bars that measured 150×5×3 mm were cut in half and refinished to ensure flat and parallel faces. All faces were finished to a fine grind and edges to be placed in tension were side chamfered. Final dimensions of the samples were 73×4.75× 2.75 mm.

Modulus of rupture was measured at room temperature and at 1200° C. Sonic resonance was used to measure elastic modulii for Sample A (fired at 1650° C. for 4 hours followed by a separate firing at 1750° C. for 4 hours) and the zircon material as a function of temperature. Poisson's ratio was obtained at room temperature using a resonant ultrasound technique. Finally, thermal expansion coefficients of many zircon structured materials are reported in E. C. Subarao, et al, *J. Am. Ceram. Soc.*, 73 [5] 1246-52, 1990, and were used for the comparison. Thermal shock resistance, $\sigma_f/(\alpha E)$, was computed from modulus of rupture ($\sigma_f$), elastic modulus (E), and thermal expansion coefficient ($\alpha$). This information is compiled and compared for xenotime and zircon in Table 8. As shown in this table, xenotime and zircon have similar properties consistent with their similar crystal structures. Predicted thermal shock resistance of xenotime is somewhat lower than zircon which suggests that a more gentle heat-up schedule may be appropriate for xenotime compared to zircon.

As demonstrated by the above examples, xenotime is a suitable refractory material for manufacturing display glass and, in particular, is a suitable material for producing the isopipes used in such manufacturing. Xenotime has outstanding creep properties, approaching two orders of magnitude improvement over the zircon currently used in the operating range of an isopipe. It is compatible with alkaline earth borosilicate display glasses for both blistering and secondary crystal growth. It is superior to zircon in that it is much more difficult to precipitate a secondary crystal at the xenotime-glass interface. There is no apparent change in the liquidus temperature (e.g., the cristobalite liquidus temperature) of display glass as a result of refractory dissolution into the glass. This combination of characteristics indicates that a xenotime isopipe can be used at significantly higher temperatures than a zircon isopipe, enabling fusion forming of higher strain point glasses for poly-silicon applications.

More specifically, the above examples demonstrate xenotime's chemical durability and compatibility with display glass, specifically, EAGLE 2000 glass, by a multi-level protocol. Secondary crystal defects were not observed in either strip gradient or stirred devitrification tests. Blister count under the dynamic stirred-devitrification test was similar to zircon isopipe material (although higher than zircon in static blister testing). Most importantly, rate of creep at 1180° C./1000 psi was measured to be $0.038 \times 10^{-6}$ hr$^{-1}$ and is a factor of 40× lower than zircon isopipe material having particularly low creep. At 1250° C., the maximum practical test temperature for zircon, the rate of creep of xenotime is a factor of 100× slower. Rate of creep of xenotime at 1320° C. is roughly comparable to that of zircon at 1180° C. On the basis of creep alone, xenotime exceeds isopipe material requirements to make both wider sheet and higher strain glass compositions without sacrifice of lifetime. In current processes, an isopipe made from xenotime will have increased life; in future processes, it will enable longer and lower aspect ratio isopipes.

The characteristics of xenotime also have implications for manufacturing isopipes. Zircon isopipes are currently cold isostatically pressed, then sintered. Cold isostatic pressing can maximize the green (unfired) density allowing the firing temperature to be kept low to avoid excessive zircon dissociation. Isostatic presses are large cylindrical pressure vessels. The dimensions of the pressure vessel determine the length and height of the isopipe blank that can be made, and diameter is more difficult to expand than length. Thus, increasing the isopipe height to counteract creep deformation is a limited option.

As discussed above, unlike zircon, xenotime is a congruently melting compound and dissociation does not limit firing temperature. Xenotime samples have been fired up to 1800° C. (data not shown), and routinely achieve density of 95% on parts isostatically pressed at 20,000 psi and fired to 1750° C. for a few hours. By firing xenotime to high density without isostatic pressing, various ceramic forming techniques for manufacturing an isopipe become available which do not limit the height of an isopipe. Moreover, because of their improved creep behavior, xenotime isopipes can be designed at a lower aspect ratio (reduced height for a given length) with equivalent lifetime at the same operating temperatures. This admits the possibility of using a longer, but smaller diameter, isopress. Thus, the use of xenotime increases fabrication options which, in turn, increases size and process capabilities.

The above examples illustrate preferred embodiments of the invention, specifically, embodiments where xenotime is the refractory material. The benefits shown for xenotime, however, are not limited to this material, but are also applicable to the other xenotime-type refractory materials disclosed and claimed herein.

EXAMPLE 11

Computer Modeling of Xenotime Stabilization of Zircon

As discussed above, xenotime is isostructural with zircon. In the structure, yttrium atoms occupy zirconium sites and phosphorous replaces silicon. Unlike zircon, xenotime melts congruently as is illustrated in the phase diagram for the yttrium oxide-phosphorous oxide binary system shown in FIG. 3. Xenotime ($YPO_4$) melts congruently at ~2150° C.

Solubility in the zircon-xenotime pseudobinary system is reported by several authors. Speer cites a reference that claims to describe naturally occurring zircons that contain as much as 25 m/o xenotime. J. A. Speer, "Zircon", in *Reviews in Mineralogy, Ortho-Silicates*, published by Mineralogical Society of America, 5, Chapter 3, 67-112, 1980. Vlasov found that xenotime contains only a few mole percent zircon and suggests that there is only limited solubility even at high temperatures. K. M. A. Vlasov, in: Mineralogy of Rare Earth Elements, Israel Program for Scientific Translations, Jerusalem, II 945, 1966. Hanchar et al grew single crystals of zircon doped with small quantities of rare-earth phosphates by flux methods to study compositional zoning but did not test limits of solubility. J. M. Hanchar, R. J. Finch, P. W. O Hoskin, E. B. Watson, D. J. Chemiak, and A. N. Mariano, *Am. Mineral*, 86 667, 2001; and J. M. Hanchar, R. J. Finch, P. W. O Hoskin, E. B. Watson, D. J. Chemiak, and A. N. Mariano, *Am. Mineral*, 86 681, 2001. Tanner et al studied solubility in the pseudobinary system experimentally and by computer modeling with pseudopotentials. C. Tanner, K. Geisinger, and R. Wusirika, "Temperature and Wavelength Dependence of Refractive Indices of Zircon and Hafnon," *Optical Materials*, 26 305-311, 2004. They found that despite the similarity in lattice parameters there is a wide miscibility gap. Solubility of xenotime in zircon and vice-versa was determined to be 12 and 14 m/o at 1500° C., respectively. They also proposed that the binary system can be described qualitatively by a regular solution model with an interaction parameter of 0.485 eV/cation. They concluded that the miscibility gap arises from the difference in valences of the ions at each site. The possibility that dissolved xenotime could raise the decomposition temperature of zircon is not mentioned in the literature.

The effect of dissolved xenotime on decomposition temperature of zircon was investigated using the FACTSAGE 5.1 thermodynamic modeling software developed and sold by GTT-Technologies, Herzogenrath, Germany. The FACTSAGE 5.1 software package makes modeling of such situations possible provided that all of the pertinent thermodynamic data is already present in its database. Unfortunately, no data could be found for xenotime. In order to be able to model the system, it was therefore assumed that aluminum phosphate ($AlPO_4$) could act as a surrogate for xenotime ($YPO_4$). Aluminum phosphate melts congruently like xenotime, and the data for this compound is present in the FACTSAGE database. A miscibility gap was created between aluminum phosphate and zircon by manually inputting parameters for the FACTSAGE binary excess potential model for solutions. The equation for the binary excess potential used by FACTSAGE is as follows:

$$x_m^i x_n^j (A+BT+CT \ln T + DT^2 + ET^3 + F/T) \quad (1)$$

where subscripts m and n denote dissolved species, T is temperatures, and i, j, A, B, C, D, E, and F are the user defined model parameters. Solubility limits and the regular solution model interaction parameter from Tanner et al., supra, were used as a starting point for selection of parameters. The decision was made, however, to treat each primary phase using a dedicated potential model for the dissolved component (i=0, j=1) instead of a regular solution model (i=j=1) with a single potential equation that governs solubilities in both phases simultaneously. This approach has the advantage of being able to independently adjust the solubility limits of one phase in the other. Table 9 lists the model parameters used.

Solubility of yttrium oxide in zirconium oxide may reduce the decomposition temperature of zircon when it is in contact with xenotime. This feature of the system was accounted for by the addition of parameters to FACTSAGE to create solubility between the aluminum oxide surrogate for yttrium oxide and zirconia. In this case, the solubility model is not intended to be faithful to the yttrium oxide-zirconium oxide phase diagram, but to account for the significant level of solubility of yttria in zirconia that is known to occur. These parameters are listed in Table 9, as well. Lastly, liquid was modeled with the FACTSAGE slag data. Although this model for the zircon-xenotime pseudobinary can be far from quantitative, it contains the right elements for predictive purposes. Indeed, as the experimental data presented below shows, the model was substantially quantitative for the solid phases, which are most relevant for the present invention.

Figure 18:
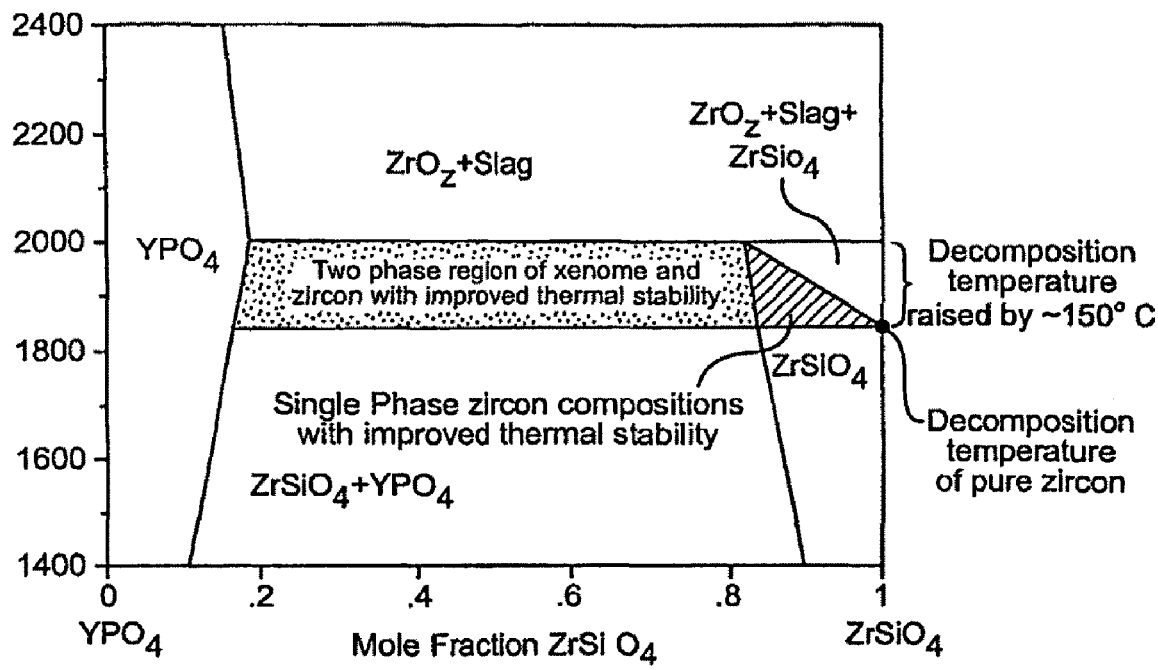
FIG. 18 is a phase diagram for the zircon-xenotime pseudo binary system calculated by FACTSAGE. The vertical axis in FIG. 18 is in degrees K.

FIG. 18 is the phase diagram calculated using the FACTSAGE software. Aluminum phosphate has been converted back to xenotime for the sake of clarity. The phase diagram predicts that the decomposition temperature of zircon can be raised by dissolution of xenotime. This can be seen in the triangular shaped wedge section on the right hand side of the diagram. The decomposition temperature increases in proportion to the quantity of dissolved xenotime. The amount of yttrium oxide dissolved in zirconia according to the model was insignificant and had no bearing on the decomposition temperature of zircon. This result may, however, change if thermodynamic data for the actual species, i.e., yttrium oxide, is used rather than the alumina containing slag model from FACTSAGE that was used in preparing FIG. 18.

The single phase region of stabilization that lies above the decomposition temperature of pure zircon is surrounded by two phase fields. At low xenotime concentrations, stabilized zircon coexists with zirconia and silica. The second region lies within the miscibility gap where stabilized zircon is in equilibrium with a xenotime phase that contains some dissolved zircon. Each of the three regions offers material opportunities beyond merely the ability to fire zircon at higher temperatures where sintering and grain growth kinetics are more rapid. Three opportunities include:

(1) Heat treatable zircon where a solutionizing treatment is followed by controlled precipitation of a xenotime phase. Heat treatability gives additional control over microstructure and can lead to further improvement of creep resistance.
(2) Controlled decomposition to generate liquid phase silica to assist sintering and densification.
(3) Xenotime-zircon composites that have the highest possible decomposition resistance for use in specialty refractory applications that demand operation at elevated temperatures or operation under more aggressive chemical environments than pure zircon can withstand.

EXAMPLE 12

Preparation of Xenotime-Stabilized Zircon from Pure Oxides

Increase in decomposition temperature of zircon in proportion to dissolved xenotime as was predicted by the computer modeling of Example 11 was verified experimentally.

Samples were batched to give the following overall compositions: 15 m/o xenotime in zircon (Sample E) and 50 m/o xenotime in zircon (Sample F). Each composition was prepared by TURBULA mixing zirconia, silica, yttria, and phosphorous oxides for 60 minutes, calcining at 190° C., reacting at 1200° C. for 24 hours, dry grinding and sieving to −325 mesh, extruding with 6% METHOCEL in the form of a ¼ inch diameter rod, and firing at temperatures between 1650 and 1760° C. in 10° C. increments.

Samples of each composition were collected after grinding and analyzed by powder XRD to observe any reactions that may have occurred at 1200° C. and to establish a baseline. A piece of SG material was included during each firing as a reference for comparison of decomposition. Fired samples were analyzed using powder XRD. One peak from each crystalline phase identified in the XRD traces was used to estimate volume fractions of the phases. Volumetric scattering intensities from the selected peak from each phase were computed using the methods described by B. D. Cullity and are given in Table 10. B. D. Cullity, *Elements of X-Ray Diffraction*, Second Edition, Addison-Wesley Publishing Company, Inc., Reading, Mass., 1978, at pages 81-143.

Figure 19:
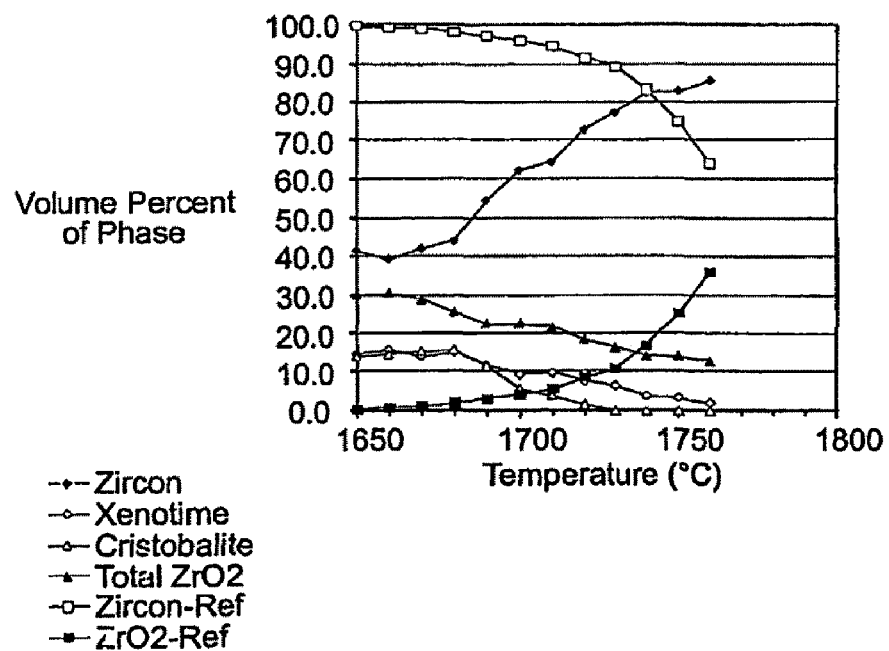
FIG. 19 is a plot of volume fractions of crystalline phases as a function of sintering temperature for stabilized-zircon Sample E (15 m/o xenotime in zircon) as compared to SG zircon reference material.
Figure 20A:
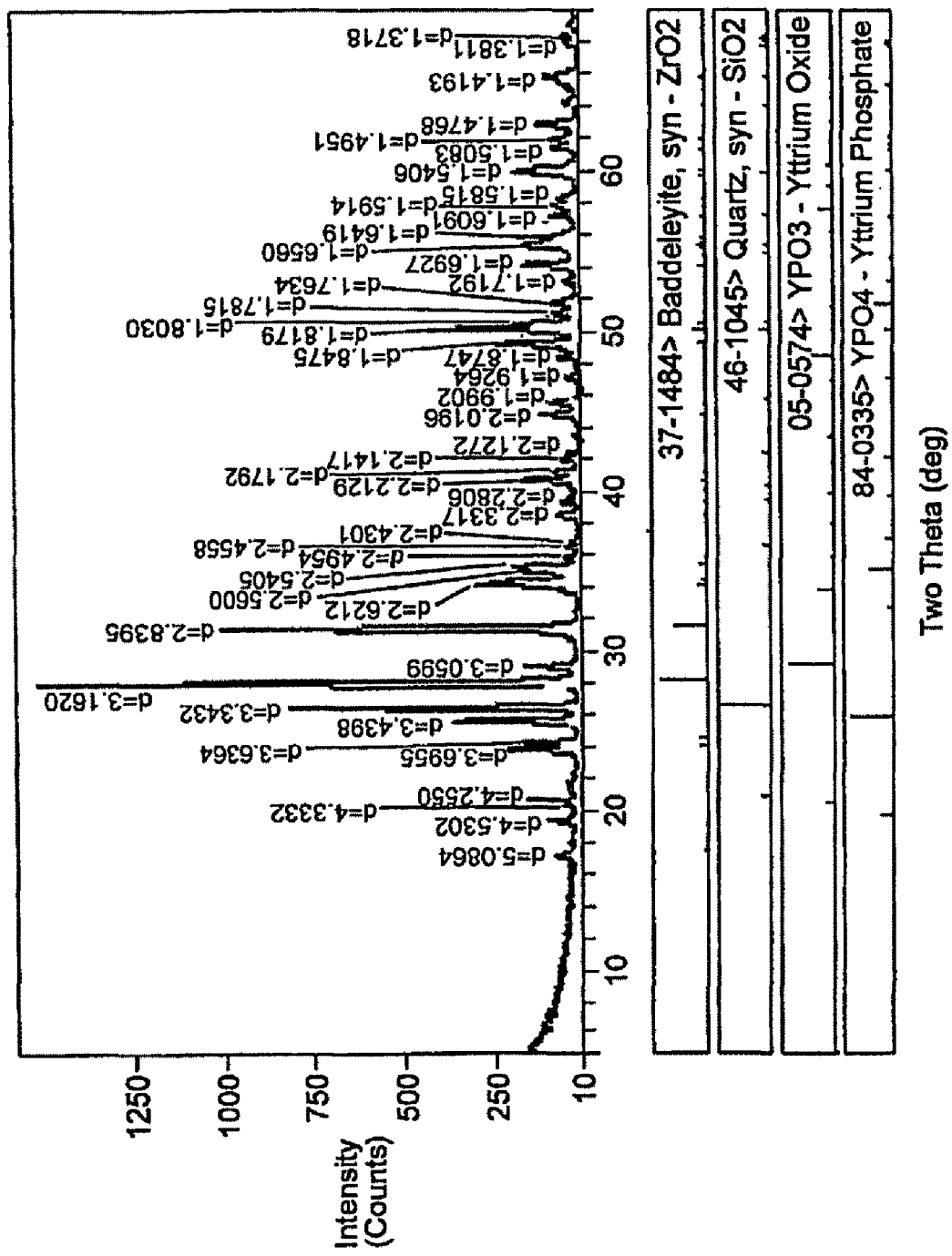
FIGS. 20A and 20B are powder XRD traces of stabilized-zircon Sample E after grinding and before extrusion (FIG. 20A) and after firing at 1760° C. for 4 hours (FIG. 20B).
Figure 20B:
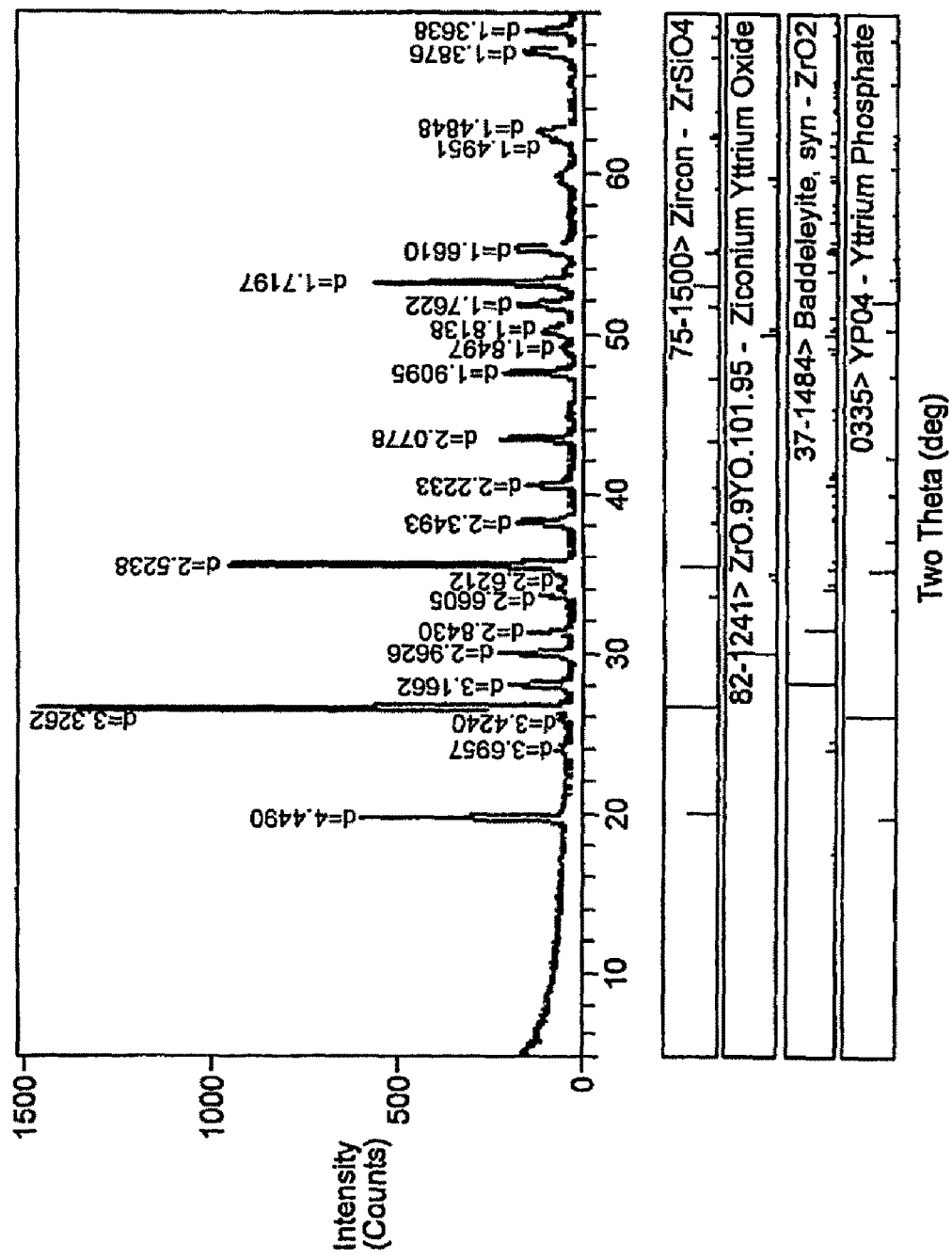

Volume fractions of crystalline phases observed in Sample E as compared to the SG zircon reference material are plotted as a function of temperature in FIG. 19. XRD traces of the −325 mesh powder after grinding and before extrusion and of the sample sintered at 1760° C. are shown in FIG. 20.

Figure 21A:
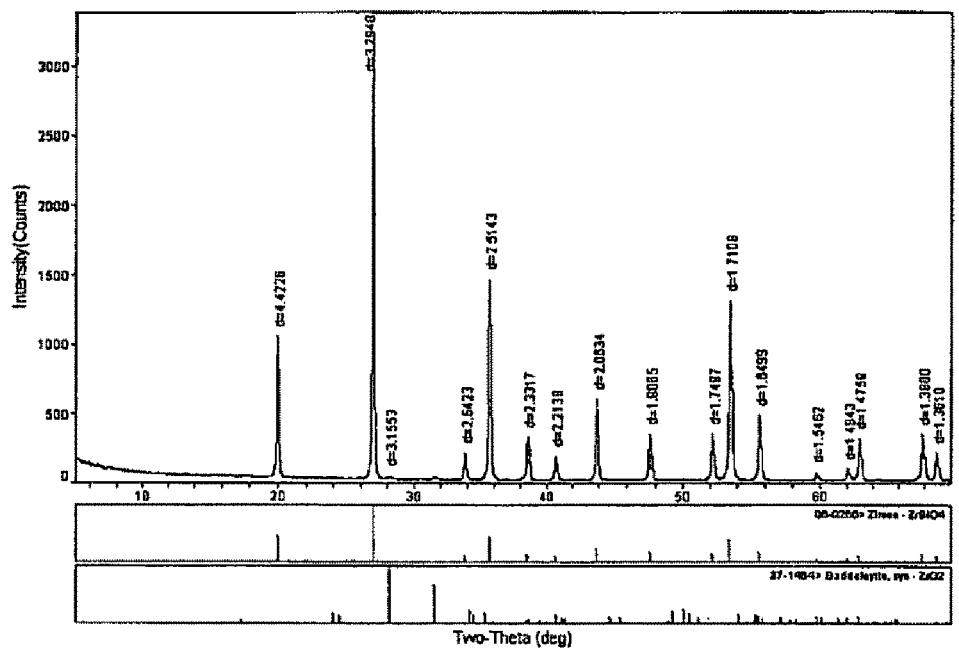
FIGS. 21A and 21B are powder XRD traces of SG zircon reference material after firing at 1650° C.
Figure 21B:
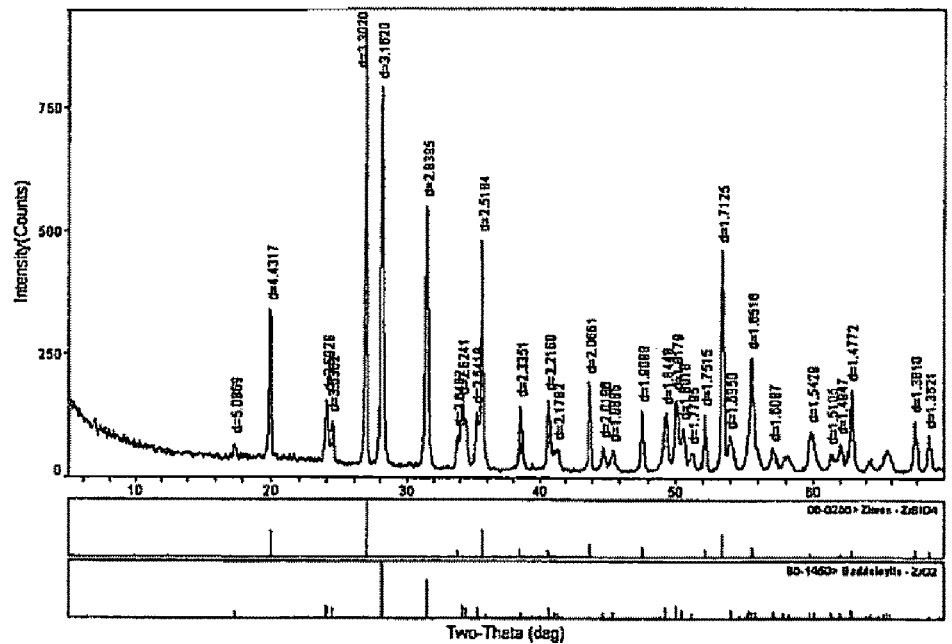

As shown in FIG. 19, at low temperatures, reaction to form zircon from zirconia and silica is incomplete and progresses moving to higher temperature. Volume percentages of zirconia, silica, and xenotime decrease as more zircon is formed. By contrast, the zircon reference shows increasing amounts of zirconia that is reflective of decomposition and thermal instability. Powder XRD traces for zircon after firing for 4 hours at 1650 and 1760° C. are shown in FIG. 21. By 1760° C., Sample E is 86% zircon phase despite the fact that the temperature is roughly 110° C. above the zircon decomposition temperature of 1650° C.

It should be noted that the total volume fraction of zirconia does not match that of silica despite the fact that the quantities of both phases should be equal. Silica in a vitreous form, however, cannot be detected by XRD. This is not a serious complication as zirconia is a surrogate for total silica.

Figure 22:
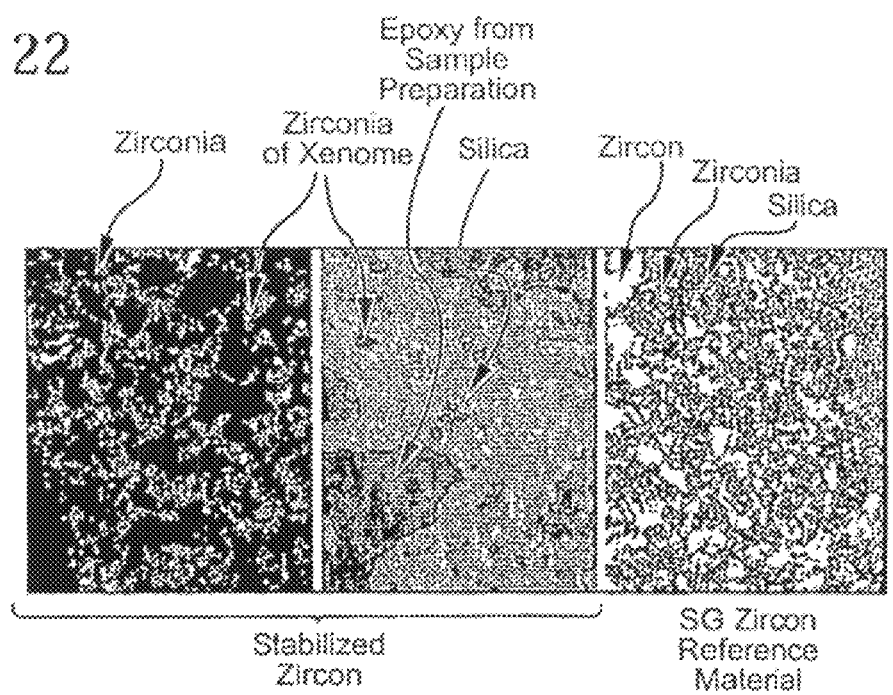
FIG. 22 shows photographs taken by electron microprobe of stabilized-zircon Sample E and SG zircon reference material that were fired at 1760° C. for 4 hours.

Micrographs of Sample E and the SG zircon reference material fired at 1760° C. are shown in FIG. 22. In the photograph of the reference material, the phases of zirconia and silica share contact with one another and with the zircon phase itself. Decomposition of pure zircon appears to originate at grain surfaces and not within the interior of a grain. One possible explanation for this is that there is a volume expansion of ~20 percent on decomposition of zircon. The activation energy barrier at the interior of a grain may be higher than on the surface.

The microstructure of Sample E shown in FIG. 22 is noticeably different from the zircon reference sample. Small regions of silica material are completely surrounded by the zircon phase and isolated from larger zirconia grains. Microstructure of the reference material when viewed in context with the results from XRD is consistent with decomposition. On the other hand, the physical separation of zirconia and silica phases by the zircon phase is indicative of incomplete reaction due to physical isolation during the reaction process that is typical in solid-state systems as opposed to decomposition of zircon after formation. These results show that not only does xenotime stabilize already formed zircon, but also allows zircon to form at temperatures where zircon should be decomposing rather than forming.

Figure 23:
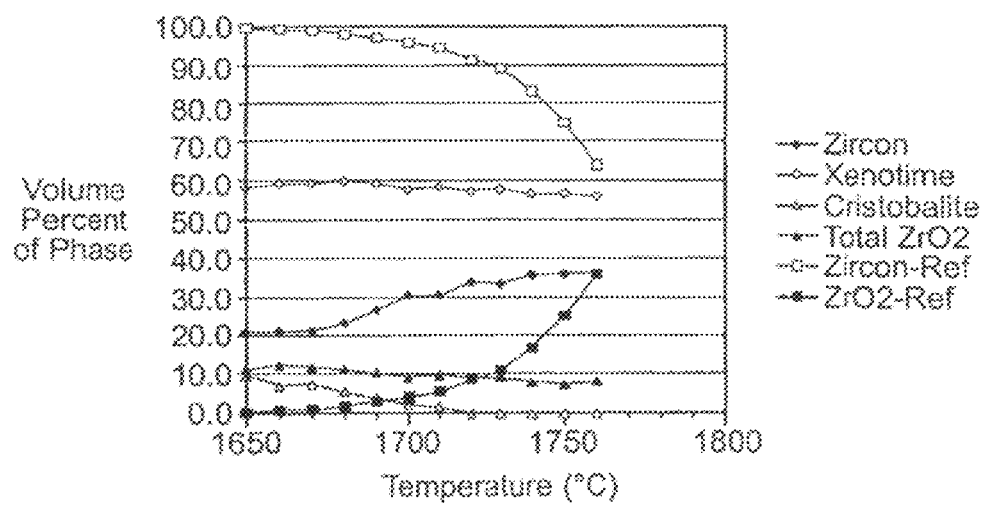
FIG. 23 is a plot of volume fractions of crystalline phases as a function of sintering temperature for stabilized-zircon Sample E (50 m/o xenotime in zircon) as compared to SG zircon reference material.

FIG. 23 is a plot of volume fractions of crystalline phases observed in Sample F. Reaction and dissolution kinetics are slow, which makes interpretation of the data more difficult. However, the plot shows that increasingly larger quantities of the zircon-based phase forms as temperature is increased while the zircon reference material decomposes. Based upon these results, it can be concluded that 15 m/o of xenotime is adequate to increase decomposition temperature of zircon by 110° C. while 50 m/o also stabilizes zircon but also generates a xenotime-with-dissolved-zircon phase as a result of the miscibility gap. That additional phase is itself stable at elevated temperatures.

Results for a third composition, Sample G (15 m/o zircon in xenotime), showed, as expected, xenotime as the major phase, and only small quantities of zircon, zirconia, and silica. Dissolution of zircon and zirconia and silica into xenotime was nearly complete by 1760° C.

Powder XRD traces obtained for Samples E, F, and G after grinding and sieving to −325 mesh were used in determining the order of reaction of the oxides. The first reaction to occur in each composition was between yttrium oxide and phosphorous oxide to form xenotime. Formation of xenotime was complete by 1200° C. as no peaks from yttrium oxide batch material were present in the XRD traces. No zircon was observed to form in any of the three compositions after reaction at 1200° C.

Reaction to form zircon from zirconia and silica in Samples E and F began between 1200 and 1650° C. XRD traces indicated that two reactions occur between 1650 and 1760° C. Total zirconia plotted in FIGS. 19 and 23 include monoclinic zirconia from the batch and cubic stabilized zirconia that contains dissolved yttrium oxide. The presence of monoclinic zirconia (badeleyite) indicates that the reaction of zirconia with silica is not complete even at 1760° C. One explanation is that the remaining monoclinic zirconia and silica are physically isolated from one another making reaction difficult. Some of the isolated particles of zirconia are in contact with xenotime and react with xenotime to form cubic, stabilized zirconia.

EXAMPLE 13

Preparation of Xenotime-Stabilized Zircon from Zircon and Xenotime

A second route for solid-state synthesis of stabilized zircon was investigated. In this route, zirconia and silica were replaced by beneficiated zircon derived from a natural source. The batching procedure consisted of TURBULA mixing of zircon, yttrium oxide, and phosphorous oxide for 60 minutes, calcining at 190° C. for 24 hours, reacting at 1475° C. for 24 hours, dry grinding to −325 mesh, and pressing parts for firing at 1750° C. in a uniaxially press or by cold-isostatically pressing in a rubber mold at 18,000 psi. Table 11 lists the overall compositions.

Figure 24:
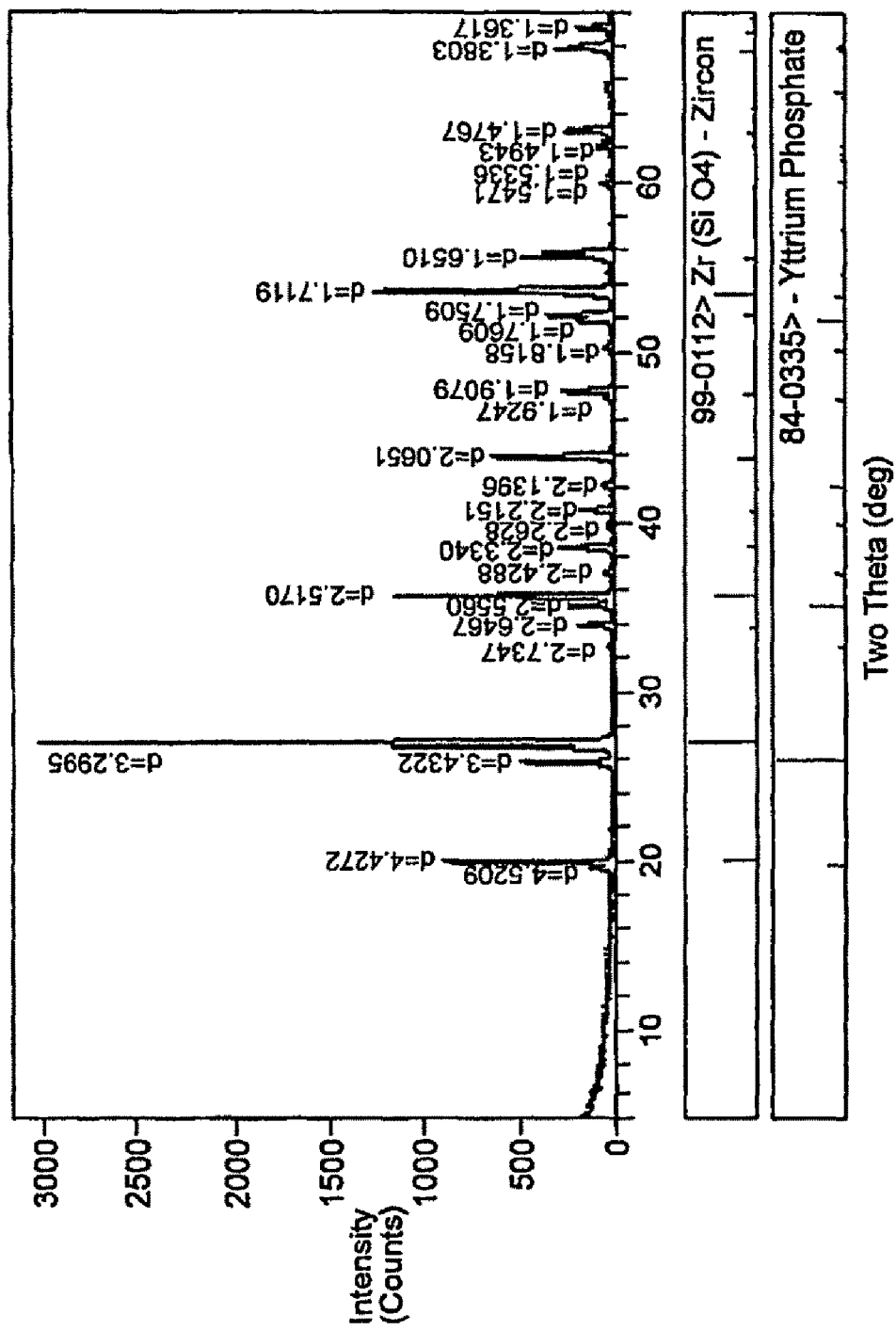
FIG. 24 is a powder XRD trace for stabilized-zircon Sample I (15 m/o xenotime in zircon) after sintering at 1475° C.
Figure 25:
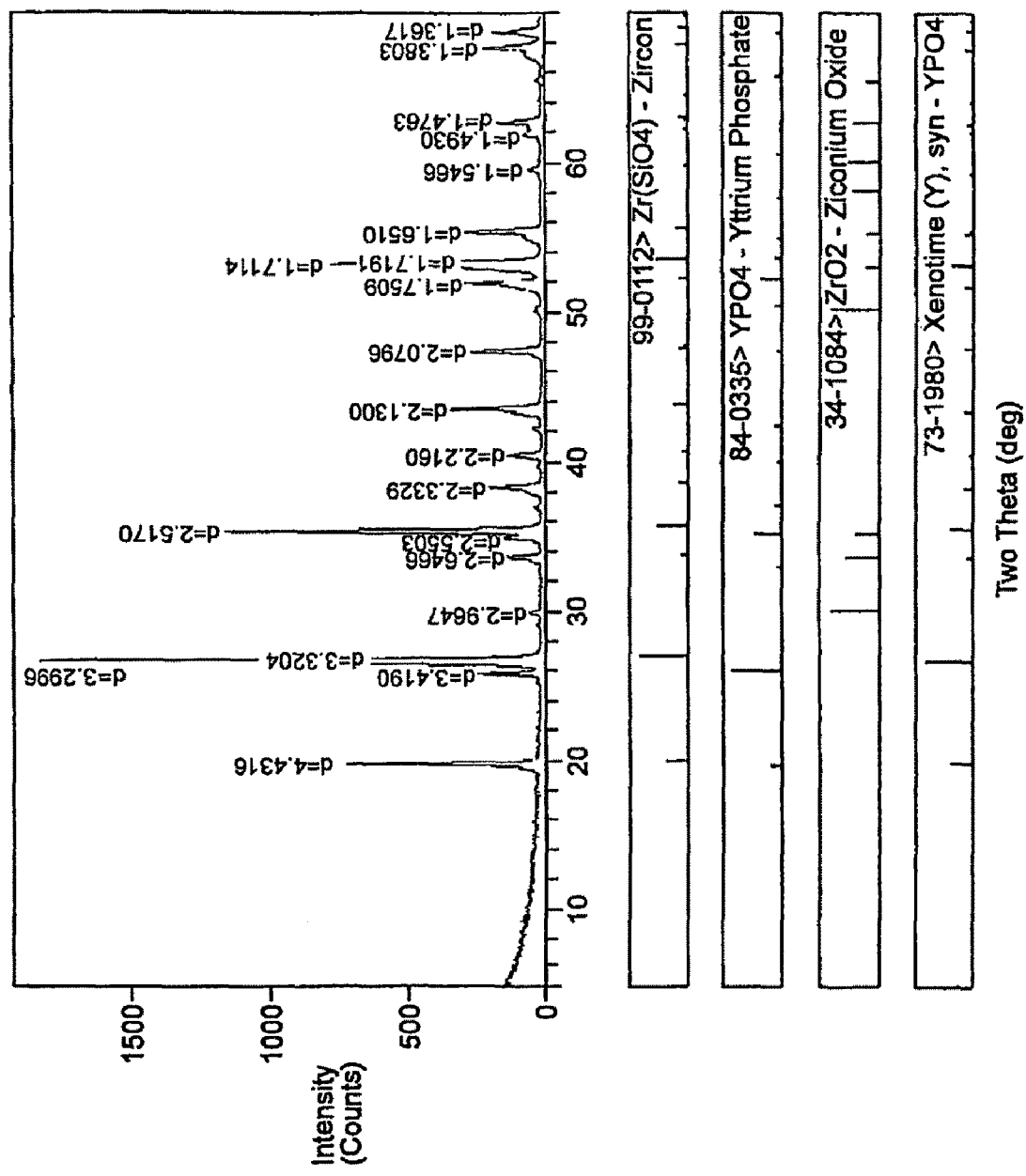
FIG. 25 is a powder XRD trace for stabilized-zircon Sample I (15 m/o xenotime in zircon) after sintering at 1750° C.

FIG. 24 is an XRD diffraction trace of the as-ground Sample I composition after reaction at 1475° C. Peaks from only two crystalline phases, zircon and xenotime, were present. FIG. 25 shows the powder XRD trace from the same material after sintering for 12 hours at 1750° C. Peaks from three crystalline phases were identified, xenotime, zircon, and ~0.7 v/o yttria-stabilized zirconia. Some vitreous silica that cannot be detected by XRD must be present to account for the zirconia.

Careful inspection of the zircon peaks reveals that there are two varieties of zircon in the sample. A small shoulder or side-peak sits between the zircon peak and the xenotime peak of the same peak index. The shoulder is quite evident on the (011) zircon peak. The shoulder peak reflects zircon with higher concentrations of dissolved xenotime. The two varieties of zircon are zircon with dissolved xenotime and zircon without or with less dissolved xenotime, perhaps unreacted zircon.

Figure 26:
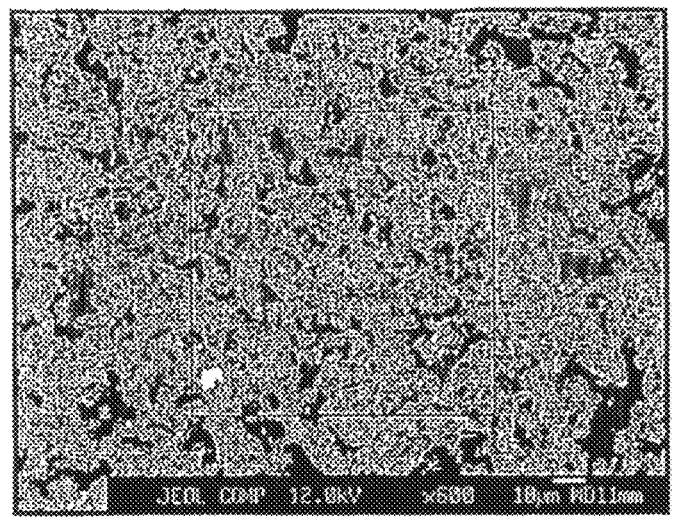
FIG. 26 is an EPMA image of uniaxially pressed stabilized-zircon Sample I after sintering at 1750° C. for 12 hours.
Figure 27A:
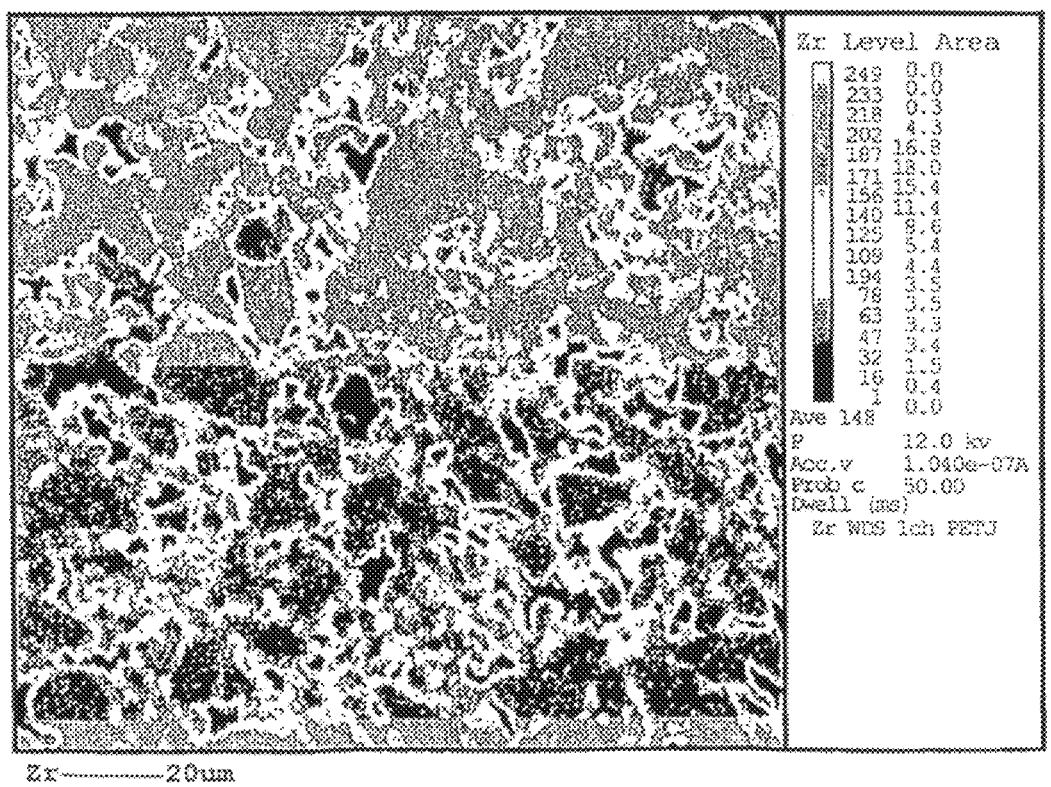
FIGS. 27A, 27B, 27C, and 27D are, respectively, compositional maps for Zr, Si, Y, and P obtained by EPMA for uniaxially pressed stabilized-zircon Sample I after sintering at 1750° C. for 12 hours.
Figure 27B:
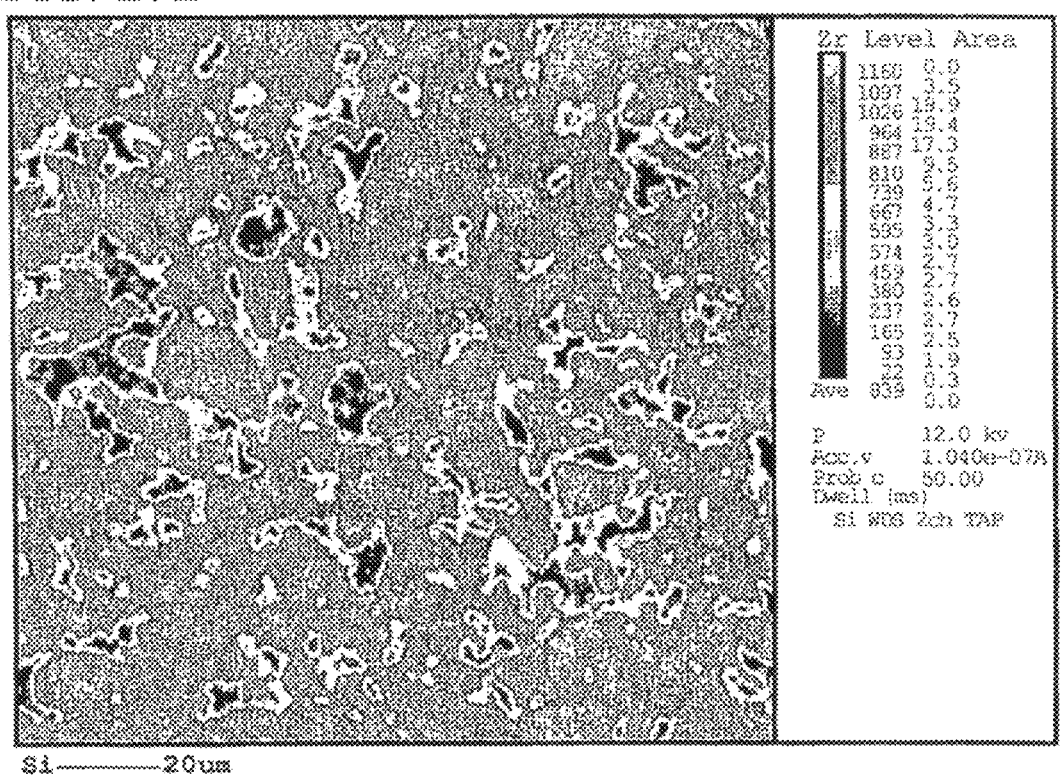
Figure 27C:
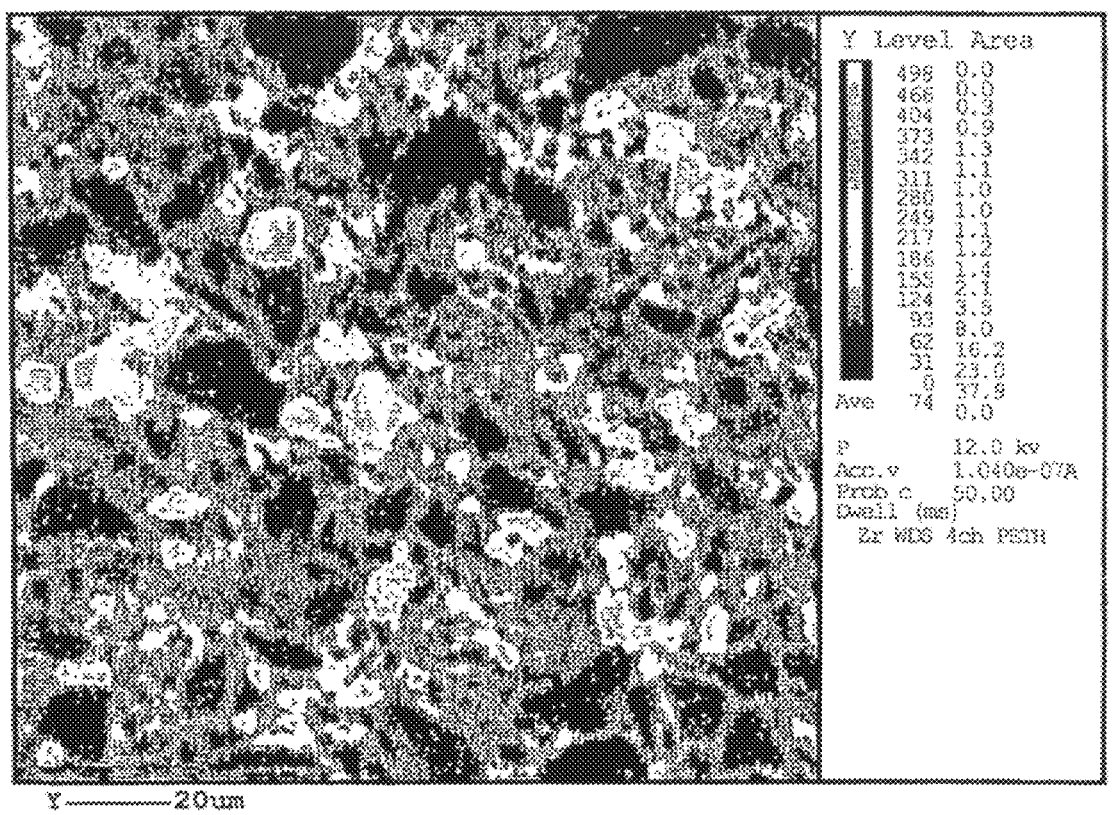
Figure 27D:
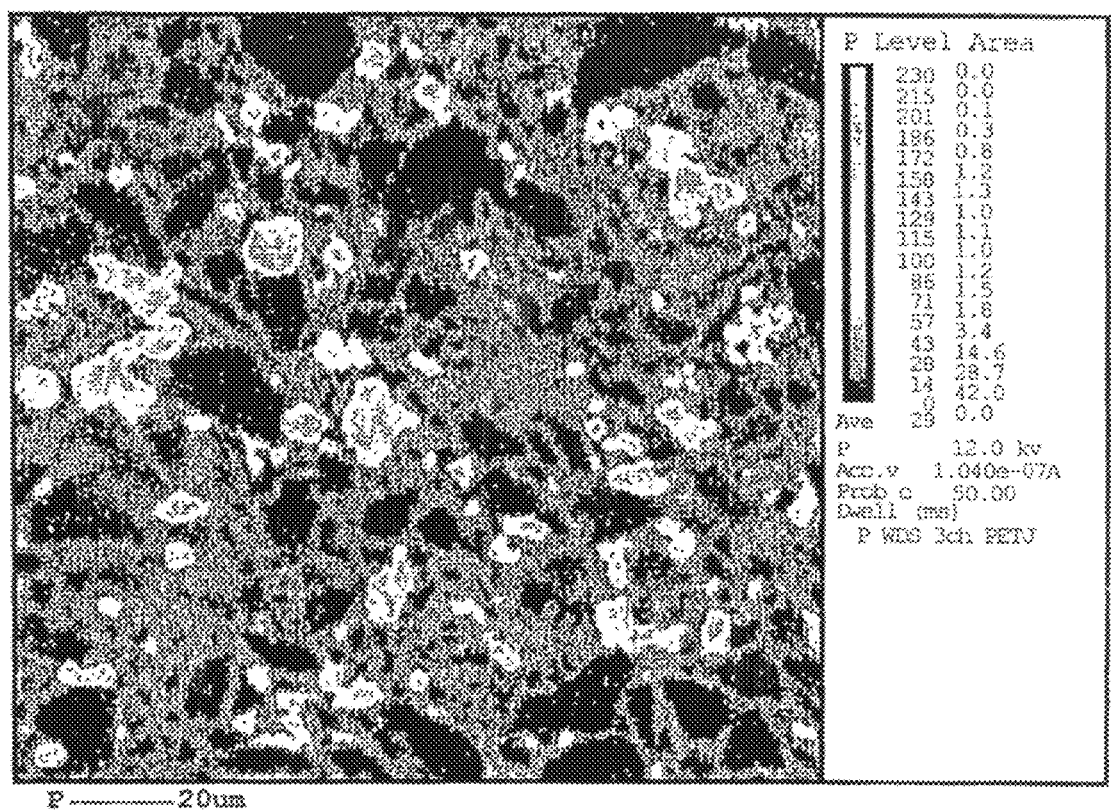

FIG. 26 is an EPMA image of atomic number contrast for the same specimen. Grains of the specimen are surrounded by a lacy structure. FIG. 27 shows compositional maps for the indicated region of FIG. 26 for Zr, Si, Y, and P.

A few grains of xenotime are easily identified in the maps of Y and P. The maps of Y and P show that xenotime has dissolved into zircon only in the areas around grain boundaries. There is little to no Y or P at the interior of the zircon grains. That is, the individual grains exhibit concentration gradients from grain boundaries to the core, i.e., the grains (phases) are inhomogeneous. This observation agrees with the XRD results. The same effect can be seen in the maps of Zr and Si. The maps of Zr and Si also show fine fluctuations of intensity with position that indicate possible decomposition of zircon at the interior of the grains into zirconia and silica. Similar results were obtained for the other batches of Table 11.

Although fewer extraneous phases are present than with synthesis from the pure oxides, diffusion of xenotime into zircon for stabilization is quite slow even at 1750° C. and competes with decomposition. Microstructures of stabilized zircon formed by diffusion (Sample I) and stabilized zircon formed by reaction of zirconia, silica, and xenotime (Sample E) look quite different. Unreacted starting materials (disequilibria) in stabilized zircon specimen Sample E are present, however, zircon grains are not compositionally zoned like in Sample I.

EXAMPLE 14

Preparation of Xenotime-Stabilized Zircon at 1800° C.

Stabilization of zircon by xenotime has been conclusively demonstrated at ~1750° C. by the preceding examples. This was a convenient temperature for experiments as it was possible to fire samples on inert platinum foil and to use a furnace with a maximum temperature of ~1750° C. Bars of the compositions listed in Table 11, as well as bars of Samples C and D (100 m/o xenotime), were fired for 24 hours at 1800° C. for two purposes: 1) to determine if dissolved xenotime is still effective at stabilizing zircon and 2) to accelerate diffusion to facilitate determination of solubility limits. Commercial fused zirconia refractory was used as a setter material. Samples were analyzed by powder XRD, EPMA (electron probe microanalysis), and ICP (ion-coupled plasma analysis) for chemical composition.

The results obtained at 1800° C. were as follows: First, zirconia was detected by XRD even in pure xenotime specimens. The zirconia was observed by EPMA to be evenly distributed throughout specimens of both Samples C and D, and the amount was estimated to be approximately 10-15 v/o (volume percent). Zirconia was not present as a contaminant in either batch material or in similar parts fired at 1750° C. Accordingly, it is believed that zirconia migrated from the setter into the samples.

Secondly, the visual appearance of the surface of all the specimens was noticeably different than the interiors to a depth of 2-3 mm. The surface skin could be explained as a consequence of reaction of the specimens with the setter or loss volatilization of some component, likely phosphorous oxide, into the ambient atmosphere. The chemical analysis of samples showed an increase in the atomic ratio of yttrium to phosphorous.

Loss of phosphorous may have occurred for two reasons. 1) Xenotime may be decomposing to generate volatile phosphorous oxide gasses. 2) Zirconia either from the setter or as a product of decomposition of zircon reacts with xenotime or stabilized zircon to dissolve away some yttrium oxide thereby liberating some phosphorous oxide to the atmosphere.

Three pieces of evidence support the conclusion that phosphorous volatilized was due to reaction of samples with the setter. 1) There was no evidence of phosphorous volatilization in pure xenotime or stabilized zircons fired at 1760° C. in air or in xenotimes fired at 1700° C. in 6% hydrogen. 2) Areas of the setter in direct contact with the samples were discolored. 3) The samples were mechanically bonded to the setter and cracked during furnace cool down due to thermal expansion mismatch.

Notwithstanding the interaction with the setter, stabilization of zircon by xenotime was confirmed to occur even at 1800° C., which is likely to be near the maximum stabilization temperature of zircon-type materials. Zircon was detected in all xenotime-containing zircon compositions by XRD. The increase in sintering temperature did not substantially accelerate interdiffusion. Zircon peaks showed shoulders similar those observed at 1750° C. and shown in FIG. 25. Diffusion zones around zircon and xenotime grains had grown in width and were large enough in size for EPMA. Sample K with 50 m/o xenotime in zircon was analyzed by EPMA to estimate solubility limits. The highest concentration of xenotime measured in zircon was ~27 m/o. Solubility of zircon in xenotime was higher at ~39 m/o.

EXAMPLE 15

Preparation of Xenotime-Stabilized Zircon with Reduced Zircon Decomposition

Using the above results as a starting point, it was determined that the decomposition reaction that competes with interdiffusion can be hindered or prevented by reducing the heating rate from 1° C./hr to 10° C./hr in the critical temperature range 1600 and 1750° C. No zirconia or silica phases were observed by XRD in materials fired under these conditions.

Selection of batch materials with a smaller average particle size distribution can be used to shorten diffusion distances and reduce inhomogeneity. In general, the presence of second phases or inhomogeneity of composition in zircon grains themselves is not considered harmful or likely to prevent use of stabilized zircon as a refractory material. Accordingly, although reduction of inhomogeneity is normally desirable, it is not considered necessary to the practice of the invention.

EXAMPLE 16

Glass Compatibility of Xenotime-Stabilized Zircon

Compatibility of xenotime-stabilized zircon with EAGLE 2000 display glass was assessed using blister, gradient-strip, and stir devitrification tests and compared to typical results for zircon. The same procedures as described above in Examples 3, 4, and 6 were used.

Figure 28A:
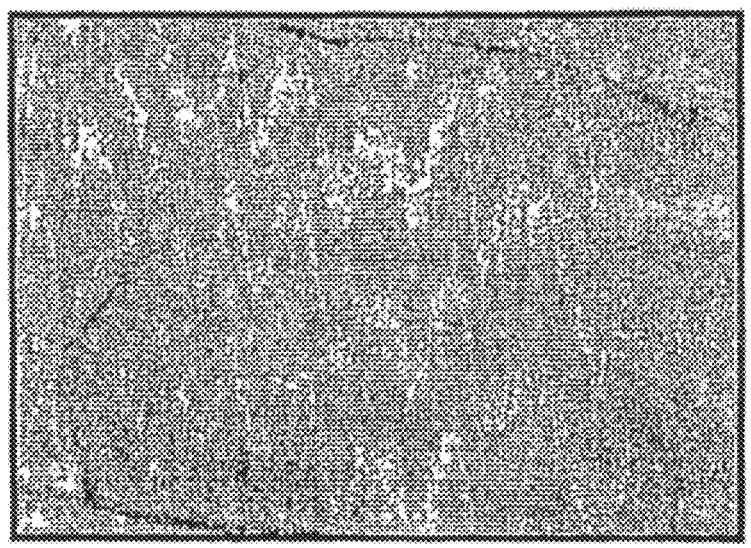
FIGS. 28A and 28B are optical photographs of a glass region of a blister test specimen using stabilized-zircon Sample I (FIG. 28A) compared to a glass region of a blister test specimen using SG zircon reference material (FIG. 28B). Both specimens were tested at 1600° C.
Figure 28B:
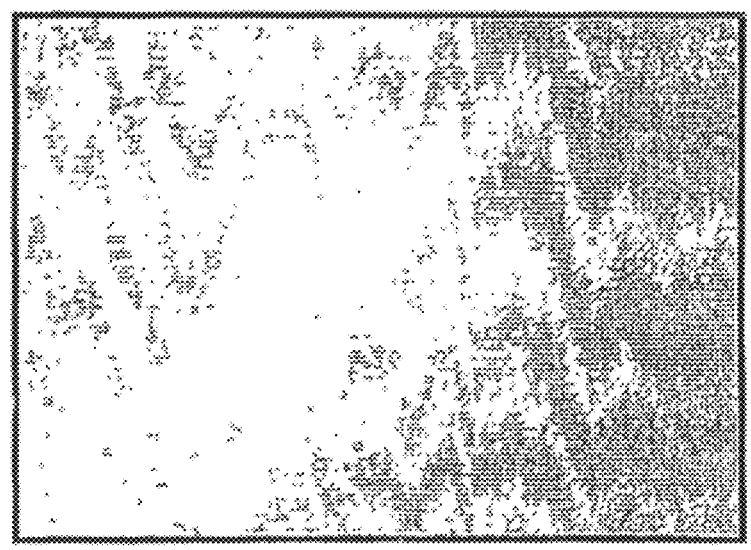

The Sample I composition was selected for testing. A blister test specimen was prepared by uniaxially pressing the refractory powder into a puck measuring ~2.5 inches in diameter and 0.25 inches thick, which was fired at 1750° C. for 4 hours. Blister tests of Sample I at 1600° C. for 96 hours showed a somewhat higher blister count compared to pure zircon. A photograph looking through the glass onto test sample is shown in FIG. 28A. The result is consistent with observations made during tests on pure zircon and xenotime specimens (see Example 3 above). Higher blister counts were obtained for xenotime alone. The presence of xenotime in the stabilized zircon is believed to be the source of the additional blisters in this test.

Samples for the strip gradient test were uniaxially pressed bars that measured ~3.5 inches in length with 0.25 inch square cross-sections. The bars were stacked end-to-end to achieve a 10 inch total length. Like the blister samples, the bars were fired at 1750° C. for 4 hours. The gradient-strip tests showed that the temperature at which crystals were first detected in the glass melt was 1090° C. The crystals are believed to be either mullite or yttrium phosphate. This is an improvement over the SG zircon reference material where crystals of cristobalite formed below 1150° C. and crystals of mullite formed below 1130° C.

A rod measuring 6 inches in length by ½ inch diameter was drilled from a billet of Sample I formed by cold isostatic pressing in a rubber mold at 18,000 psi and again firing at 1750° C. for 4 hours. The stirred-devitrification test, which as discussed above is designed to simulate a real flowing glass situation, showed stabilized zircon to be comparable to pure zircon in compatibility with EAGLE 2000. Behavior of the stabilized zircon material in the stirred-devitrification test was comparable to that of pure xenotime (see Example 6 above).

EXAMPLE 17

Creep Testing of Xenotime-Stabilized Zircon

Rate of creep of two stabilized zircons, Sample I and Sample K, were measured. Billets for machining into 3×5×150 mm sized creep specimens were formed by cold isostatic pressing of −325 mesh powders at 18,000 psi in a rubber mold and firing for 4 hours at 1750° C. Creep was measured in three-point flexion at 1180±5° C. with an applied load of 1000 psi. Isopressed SG zircon reference material from several lots was used as a reference for comparison.

Intrinsic rate of creep for the stabilized zircons was determined to be $5.2 \times 10^{-6}$ and $1.1 \times 10^{-6}$/hr for 15 and 50 m/o xenotime, respectively. Creep rates are summarized in Table 12. Rate of creep of 15 m/o xenotime stabilized zircon is comparable to but slightly higher than most of the zircon lots. Rate of creep for Sample K (50 m/o xenotime in zircon) was lower than even the best zircon lot. Both Sample I and Sample K stabilized zircons were formed by reaction of zircon and xenotime. Incomplete interdiffusion and presence of unwanted reaction products that result from competitive decomposition of zircon at 1750° C. were present in varying quantities. Despite this situation, rates of creep of the stabilized zircon compositions were competitive with or superior to the SG zircon reference material.

A further xenotime-stabilized zircon-type material was prepared from zircon, $Y_2O_3$, and $P_2O_5$ batch materials. The quantities of starting materials were chosen to give a final refractory composition which comprised 32 m/o xenotime. However, the amount of $Y_2O_3$ was reduced so that the overall composition was 2 wt. % deficient in $Y_2O_3$. The powder for this material was prepared in the same manner as the powder for the Sample I material described above. However, billets for machining into creep test samples were formed by cold isostatic pressing at 6,000 and 12,000 psi, rather than 18,000 psi. Billets were fired at 1750° C. for 4 hours. It should be noted that these specimens were fired at higher temperatures (specifically, at temperatures above the sintering temperature of zircon) and were pressed at a lower pressures than the Sample I specimens. The higher firing temperature was selected to compensate for the lower isostatic pressure.

Creep tests were performed using 3×5×150 mm sized creep specimens under the same conditions and test geometry (3-point test) as described above. Rates of creep were measured to be $4.26 \times 10^{-7}$/hr and $4.01 \times 10^{-7}$/hr for the 6,000 and 12,000 psi pressures, respectively. These creep values are a factor of 4 improvement compared to the best lot of SG zircon reference material listed in Table 12.

The specimens had a porosity of about 15 percent. It is expected that by control of the particle size distribution to optimize particle packing, lower porosities and thus even lower rates of creep can be achieved.

The above examples demonstrate that the dissolution of xenotime in zircon can increase the decomposition temperature of zircon by at least 150° C. The maximum decomposition temperature is constrained by the solubility limit of xenotime in zircon. The examples also show that the reaction of zirconia and silica in the presence of xenotime occurs and progresses as temperature is increased from the normally cited decomposition temperature of 1650 to 1760° C. X-ray diffraction (XRD) and electron microprobe analysis (EPMA) specifically show that zircon is stabile to at least 1800° C. when stabilized with xenotime.

Stabilization of zircon against decomposition creates an enhanced refractory. Most generally, stabilized zircon can serve as a specialty refractory in higher temperature situations or under harsher chemical environments where pure zircon would normally fail. For example, as discussed above, stabilized zircon can significantly improve the fusion draw isopipe that is a key component in the manufacture of flat panel display glass.

Compatibility with EAGLE 2000 display glass was also confirmed using blister, strip-gradient, and stirred-devitrification tests. These tests showed that the presence of dissolved xenotime does not substantially contribute to additional defects as compared to commercial zircon and is therefore unlikely to adversely affect glass quality. Rate of creep of stabilized zircon was measured to be competitive with or better than commercially-available isopressed zircon.

Impurities found in commercial zircon ores reduce the decomposition temperature of zircon and limit sintering temperatures to less than 1600° C. High green density achieved with the assistance of cold isostatic pressing is therefore required to obtain good final density at relatively low sintering temperatures. The cost of cold isopressing equipment, however, will eventually limit the width and cross-sectional area of the isopipe, and thereby the ability to provide wider display glass. The increase in decomposition temperature of stabilized zircon can be used to address this problem by facilitating fabrication, sintering, and densification.

For example, simple forming techniques such as slip-casting can be applied to stabilized zircon while still delivering densities of >4.0 g/cm$^3$. Stabilized zircon can be fired at a higher temperature to enhance grain growth kinetics. Rate of creep is known to be controlled in part by grain size. Creep rate typically decreases as grain size increases for the same material. See Kingery, Bowen, and Uhlman, *Introduction to Ceramics*, Second Edition, John Wiley and Sons, pages 739-745, 1976. Thus, through processing optimizations, xenotime stabilized zircon can achieve lower creep rates than commercial zircons.

The above Examples 11-17 illustrate certain preferred embodiments of the invention, specifically, embodiments where YPO$_4$ is used to stabilize zircon. The benefits shown for YPO$_4$ and zircon, however, are not limited to these materials, but are also applicable to the other xenotime-stabilized zircon-type materials disclosed and claimed herein. Similarly, the benefits relating to higher decomposition temperatures and reduced creep rates are also applicable to the vanadate-stabilized zircon-type materials of the invention.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

Composition and mixing information for various $YPO_4$ samples prepared by reaction of yttrium nitrate hexahydrate and phosphoric acid solutions, as well as phases detected by XRD after firing at 1750° C. for 4 hours.

| Batch | Mixing | Target Composition | Phases after 1750° C. |
|---|---|---|---|
| 1 | $H_3PO_4$ into $Y(NO_3)_3$ | $YPO_4$ | Xenotime |
| 2 | $Y(NO_3)_3$ into $H_3PO_4$ | $YPO_4$ | Xenotime |
| 3 | $Y(NO_3)_3$ into $H_3PO_4$ | $Y_{1.05}PO_{4.075}$ | Xenotime and $Y_2O_3$ |
| 4 | $Y(NO_3)_3$ into $H_3PO_4$ | $YP_{1.05}O_{4.125}$ | Xenotime |

TABLE 2

Thermal gradient for test of static devitrification.

| Ch 5 | Ch 4.5 | Ch 4 | Ch 3.5 | Ch 3 | Ch 2.5 | Ch 2 | Ch 1.5 | Ch 1 |
|---|---|---|---|---|---|---|---|---|
| 1469 | 1457.5 | 1446 | 1387 | 1328 | 1231 | 1134 | 1025.5 | 917 |

Isopipe Range

TABLE 3

Blister count and size at each temperature for the static devitrification test and comments regarding the nature of the glass-yttrium phosphate interface.

| Channel | Temp | # Blisters | ~Size | Magnification | Comments |
|---|---|---|---|---|---|
| 5 | 1469 | 3 | 107 um | 125× | Sporadic Pattern |
| 4.75 | 1463.25 | 6 | 40-615 um | 125× | Sporadic Pattern |
| 4.5 | 1457.5 | 12 | 50-125 um | 125× | Sporadic Pattern |
| 4.25 | 1451.75 | 13 | 20 um | 125× | Sporadic Pattern |
| 4 | 1446 | | | | Flaw in sample |
| 3.75 | 1416.5 | 40 | 40 um | 125× | Band in glass ~30 um from Interface |
| 3.5 | 1387 | 30 | 30 um | 125× | Band In glass ~30 um from Interface |
| 3.25 | 1357.5 | 7 | 110 um | 125× | 40 um size blister band in glass ~70 um from Interface |
| 3 | 1328 | 15 | 40 um | 125× | Sporadic Pattern |
| 2.75 | 1279.5 | 11 | 50 um | 125× | Sporadic Pattern |
| 2.5 | 1231 | 5 | 20-90 um | 125× | Sporadic Pattern |
| 2.25 | 1182.5 | 22 | 20-100 um | 125× | Sporadic Pattern |
| 2 | 1134 | 37 | 60 um | 125× | Sporadic Pattern |
| 1.75 | 1079.75 | 38 | 10-115 um | 125× | Sporadic Pattern |
| 1.5 | 1025.5 | 50 | 10-115 um | 125× | Sporadic Pattern |

TABLE 4

Possible reactions of xenotime with common oxides and products after reaction at the given temperature as determined by XRD.

| Oxide | Possible Reaction | Temperature (° C.) | Major Phases | Minor Phases |
|---|---|---|---|---|
| $Na_2O$ | $\frac{1}{2}Na_2O + YPO_4 \rightarrow Na_3PO_4 + \frac{1}{2}Y_2O_3$ | 1400 | $Y_2O_3$, $Na_3PO_4$ | — |
| CaO | $3CaO + 2YPO_4 \rightarrow Ca_3P_2O_8 + Y_2O_3$ | 1400 | $Y_2O_3$, $Ca_{10}P_6O_{25}$ | $Ca_3P_2O_8$ |
| MgO | $3MgO + 2YPO_4 \rightarrow Mg_3P_2O_8 + Y_2O_3$ | 1500 | $YPO_4$, MgO | — |
| $B_2O_3$ | $B_2O_3 + 2YPO_4 \rightarrow 2BPO_4 + Y_2O_3$ | 1400 | $YPO_4$ | $YBO_3$ (3%) |
| $Al_2O_3$ | $Al_2O_3 + YPO_4 \rightarrow YAlO_3 + AlPO_4$ | 1500 | $YPO_4$, $Al_2O_3$ | $YAlO_3$ |
| $SiO_2$ | $SiO_2 + 2YPO_4 \rightarrow Y_2SiO_5 + P_2O_5$ | 1500 | $YPO_4$, $SiO_2$ | — |
| $TiO_2$ | $2TiO_2 + 2YPO_4 \rightarrow Y_2Ti_2O_7 + P_2O_5$ | 1500 | $YPO_4$, $TiO_2$ | $Y_2Ti_2O_7$ |
| $ZrO_2$ | $ZrO_2 + YPO_4 \rightarrow ZrP_2O_7 + Y_2O_3$ | 1500 | $YPO_4$, $mZrO_2$ | YSZ |
| $Nb_2O_5$ | $Nb_2O_5 + 2YPO_4 \rightarrow Y_2O_3 + 2NbPO_5$ | 1400 | $YPO_4$, $Nb_2O_5$ | $YNbO_4$ |

TABLE 5

Sample compositions and reaction temperatures for yttrium phosphate compositions used in measurement of creep rate, elastic modulus, thermal expansion, and modulus of rupture.

| Sample | Reactants Weights (g) $Y_2O_3$ | Reactants Weights (g) $P_2O_5$ | Reaction Temperature (° C.) | Use |
|---|---|---|---|---|
| A | 1228.17 | 779.8 | 1200 | Elastic Modulus |
| B | 1228.17 | 772.0 | 1200 | Creep, MOR |
| C | 1228.17 | 779.8 | 1475 | Creep |
| D | 1228.17 | 772.0 | 1475 | Creep, CTE |

TABLE 6

Summary of measured creep rate comparing yttrium phosphate compositions to zircon isopipe material.

| Run # | Sample | Temperature (° C.) | Creep Rate (×10⁶ in/hr) | Improvement Normalized to Zircon |
|---|---|---|---|---|
| 1 | D | 1183 | 21.2 | 14.7 |
| 1 | C | 1186 | 130 | 2.39 |
| 1 | Zircon | 1181 | 311 | 1.00 |
| 2 | D | 1184 | 16.0 | 16.0 |
| 2 | C | 1186 | 144 | 1.78 |
| 2 | Zircon | 1187 | 256 | 1.00 |

TABLE 7

Comparison of rates of creep of xenotime (Sample B) and low creep zircon as a function of temperature for two stress loads in the case of Sample B.

| | Temperature (° C.) | Microstrain (/hr) |
|---|---|---|
| Sample B 1000 psi | 1187 | 0.038 |
| | 1250 | 0.46 |
| | 1320 | 0.94 |
| | 1390 | 7.03 |
| Low Creep Zircon 1000 psi | 1183 | 1.57 |
| | 1250 | 45.2 |

TABLE 7-continued

Comparison of rates of creep of xenotime (Sample B) and low creep zircon as a function of temperature for two stress loads in the case of Sample B.

| | Temperature (° C.) | Microstrain (/hr) |
|---|---|---|
| Sample B | 1320 | 0.45 |
| 250 psi | 1390 | 3.27 |
| Low Creep Zircon | 1182 | 0.42 |
| 250 psi | | |

TABLE 8

Thermomechanical properties of xenotime and zircon.

| Property | Xenotime | Zircon |
|---|---|---|
| Lattice Parameters, a (nm) | 6.904 | 6.605 |
| c (nm) | 6.035 | 5.979 |
| Density, $\rho$ (g/cm$^3$) | 4.246 | 4.669 |
| *Thermal Expansion, $\alpha_a$ (ppm/K) | 5.4 | 3.2 |
| $\alpha_c$ (ppm/K) | 6.0 | 5.4 |
| Average | 5.6 | 4.1 |
| Elastic Modulus, E (Mpsi) | | |
| 25° C. | 23.7 | 28.8 |
| 1200° C. | 20.5 | 25.7 |
| Poisson's ratio, $\nu$ | 0.248 | 0.266 |
| Modulus of rupture, $\sigma_f$ (kpsi) | | |
| 25° C. | 15.1 | 21.5 |
| 1200° C. | 17.9 | 15.0 |
| Thermal shock resistance (° C.) | 130 | 160 |
| Melting/Decomposition, $T_m$ (° C.) | 2150 | 1650 |

*Thermal expansion values obtained from E. C. Subarao et al., J. Am. Ceram. Soc., 73 [5] 1246-52, 1990.

TABLE 9

Binary excess potential model parameters used in FACTSAGE as defined in equation #1 for modeling of the zircon-xenotime pseudobinary system.

| Primary phase (m) | Dissolved Component (n) | A | i | j |
|---|---|---|---|---|
| Zircon | Xenotime | 18000 | 0 | 1 |
| Xenotime | Zircon | 18000 | 0 | 1 |
| Zirconia | Yttria | 10000 | 0 | 1 |
| Yttria | Zirconia | 40000 | 0 | 1 |

All coefficients in equation #1, with the exception of A, were set to zero.

TABLE 10

Volumetric scattering coefficients for peaks from phases determined to be present in samples of stabilized zircons.

| Phase | Structure | Peak (hkl) | d-spacing | Volumetric Intensity |
|---|---|---|---|---|
| Cristobalite | P41212 | 101 | 4.039 | 58.20 |
| Badeleyite | P21/c | −111 | 3.162 | 89.10 |
| Cubic Zirconia | Fm3m | 111 | 2.930 | 114.79 |
| Zircon | I41/amd | 200 | 3.302 | 57.52 |
| Xenotime | I41/amd | 200 | 3.443 | 54.46 |

Note,
badeleyite is the mineralogical name for monoclinic zirconia.

TABLE 11

Compositions of stabilized zircons prepared by interdiffusion.

| Sample | Mole Percent Xenotime in Zircon |
|---|---|
| H | 10 |
| I | 15 |
| J | 25 |
| K | 50 |
| L | 75 |

TABLE 12

Intrinsic rate of creep of two stabilized zircons as compared to six lots of SG reference material.

| Material | Microstrain (/hr) |
|---|---|
| Zircon | 4.26 |
| Zircon | 4.28 |
| Zircon | 4.83 |
| Zircon | 1.70 |
| Zircon | 2.19 |
| Zircon | 2.11 |
| Sample I (15 m/o xenotime) | 5.12 |
| Sample K (50 m/o xenotime) | 1.11 |

What is claimed is:

1. Apparatus for producing a glass or a glass-ceramic, said apparatus comprising a surface adapted to contact the glass or the glass-ceramic when the glass or the glass-ceramic is in a molten state, at least a portion of the apparatus being composed of a bulk metal phosphate refractory material having a volume of at least 200 cubic centimeters that comprises at least 90 volume percent of a phase which consists essentially of $Re_2O_3.P_2O_5$, wherein $Re_2O_3$ is $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination of two or more thereof.

2. The apparatus of claim 1 wherein at least a portion of the $Re_2O_3.P_2O_5$ is in a crystal structure which has the I41/amd space group.

3. The apparatus of claim 1 wherein the portion of the apparatus that is composed of the refractory material is at least 50 volume percent of the apparatus.

4. The apparatus of claim 1 wherein the portion of the apparatus that is composed of the refractory material is the entire apparatus.

5. The apparatus of claim 1 wherein:
(i) the apparatus comprises a core and a coating on the core, said core and coating having different compositions;
(ii) the surface adapted to contact the molten glass or the molten glass-ceramic is a surface, or a portion of a surface, of the coating; and
(iii) the portion of the apparatus that comprises the refractory material comprises at least a portion of the core.

6. The apparatus of claim 5 wherein the coating comprises a second refractory material.

7. The apparatus of claim 1 wherein the surface adapted to contact the molten glass or the molten glass-ceramic directs a flow of the molten glass or the molten glass-ceramic.

8. The apparatus of claim 7 wherein the apparatus is a forming trough of a fusion process.

9. The apparatus of claim 8 wherein the entire trough is composed of the refractory material.

10. The apparatus of claim 8 wherein the forming trough has an operating temperature above 1280° C.

11. The apparatus of claim 8 wherein the forming trough has a length sufficient to produce sheets of the glass or the glass-ceramic having a width of at least 2.5 meters.

12. The apparatus of claim 8 wherein the forming trough has a use life of at least 3.5 years when operated at a temperature that is less than or equal to 1280° C.

13. The apparatus of claim 1 wherein the refractory material has a flexural creep rate at 1250° C. and 1000 psi that is less than $45 \times 10^{-6}$/hour.

14. The apparatus of claim 1 wherein $Re_2O_3$ consists essentially of $Y_2O_3$.

15. The apparatus of claim 14 wherein $Re_2O_3.P_2O_5$ substantially satisfy the compositional formula $YPO_4$.

16. The apparatus of claim 1 wherein the refractory material has a flexural creep rate at 1250° C. and 1000 psi that is less than or equal to $15 \times 10^{-6}$/hour.

17. A method for producing a glass or a glass-ceramic comprising:
(I) providing apparatus for producing the glass or the glass-ceramic, wherein:
(A) the apparatus comprises a surface adapted to contact the glass or the glass-ceramic when the glass or the glass-ceramic is in a molten state; and
(B) at least a portion of the apparatus is composed of a bulk metal phosphate refractory material having a volume of at least 200 cubic centimeters that comprises at least 90 volume percent of a phase which consists essentially of $Re_2O_3.P_2O_5$, wherein $Re_2O_3$ is $Y_2O_3$, $Sc_2O_3$, $Er_2O_3$, $Lu_2O_3$, $Yb_2O_3$, $Tm_2O_3$, $Ho_2O_3$, $Dy_2O_3$, $Tb_2O_3$, $Gd_2O_3$, or a combination of two or more thereof; and
(II) contacting at least a portion of the surface with the glass or the glass-ceramic in a molten state.

18. The method of claim 17 wherein in step (II), the glass or glass-ceramic in a molten state has a temperature above 1280° C.

19. The method of claim 17 wherein at least a portion of the $Re_2O_3.P_2O_5$ is in a crystal structure which has the I41/amd space group.

20. The method of claim 17 wherein the portion of the apparatus that is composed of the refractory material is the entire apparatus.

21. The method of claim 17 wherein the surface adapted to contact the molten glass or the molten glass-ceramic directs a flow of the molten glass or the molten glass-ceramic.

22. The method of claim 21 wherein the apparatus is a forming trough of a fusion process.

23. The method of claim 22 wherein the entire trough is composed of the refractory material.

24. The method of claim 22 wherein the forming trough has an operating temperature above 1280° C.

25. The method of claim 22 wherein the forming trough has a length sufficient to produce sheets of the glass or the glass-ceramic having a width of at least 2.5 meters.

26. The method of claim 22 wherein the forming trough has a use life of at least 3.5 years when operated at a temperature that is less than or equal to 1280° C.

27. The method of claim 17 wherein the refractory material has a flexural creep rate at 1250° C. and 1000 psi that is less than $45 \times 10^{-6}$/hour.

28. The method of claim 17 wherein the $Re_2O_3$ consists essentially of $Y_2O_3$.

29. The method of claim 28 wherein the $Re_2O_3.P_2O_5$ substantially satisfy the compositional formula $YPO_4$.

30. The method of claim 17 wherein the apparatus is formed by a process which comprises firing a green body and said firing is performed on platinum or zirconia.

31. The method of claim 17 wherein the refractory material has a flexural creep rate at 1250° C. and 1000 psi that is less than or equal to $15 \times 10^{-6}$/hour.

32. The method of claim 17 wherein the apparatus is formed by a process which comprises firing a green body and said firing is performed at above 1650° C.

33. The apparatus of claim 1, wherein the bulk metal phosphate refractory material further comprises an excess amount of $Re_2O_3$ relative to $P_2O_5$ of at most 5% by mole.

34. The apparatus of claim 1, wherein the bulk metal phosphate refractory material comprises an excess amount of $Y_2O_3$ relative to $P_2O_5$ of at most 5% by mole.

35. The method of claim 17, wherein the bulk metal phosphate refractory material further comprises an excess amount of $Re_2O_3$ relative to $P_2O_5$ of at most 5% by mole.

36. The method of claim 17, wherein the bulk metal phosphate refractory material comprises an excess amount of $Y_2O_3$ relative to $P_2O_5$ of at most 5% by mole.

* * * * *